(12) United States Patent
Shabtay et al.

(10) Patent No.: US 11,809,066 B2
(45) Date of Patent: *Nov. 7, 2023

(54) COMPACT FOLDED CAMERA STRUCTURE

(71) Applicant: Corephotonics Ltd., Tel Aviv (IL)

(72) Inventors: Gal Shabtay, Tel Aviv (IL); Ephraim Goldenberg, Tel Aviv (IL); Itay Yedid, Tel Aviv (IL); Gil Bachar, Tel Aviv (IL); Noy Cohen, Tel Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/178,582

(22) Filed: Mar. 6, 2023

(65) Prior Publication Data

US 2023/0205059 A1    Jun. 29, 2023

Related U.S. Application Data

(63) Continuation of application No. 17/715,093, filed on Apr. 7, 2022, now Pat. No. 11,619,864, which is a continuation of application No. 16/338,483, filed as application No. PCT/IB2018/058974 on Nov. 14, 2018, now Pat. No. 11,333,955.

(60) Provisional application No. 62/618,304, filed on Jan. 17, 2018, provisional application No. 62/590,324, filed on Nov. 23, 2017.

(51) Int. Cl.
*H04M 1/02* (2006.01)
*G03B 17/17* (2021.01)
*G03B 15/03* (2021.01)

(52) U.S. Cl.
CPC ............. *G03B 17/17* (2013.01); *G03B 15/03* (2013.01); *H04M 1/0264* (2013.01)

(58) Field of Classification Search
USPC .......................................... 396/155; 359/351
See application file for complete search history.

(56) References Cited

U.S. PATENT DOCUMENTS 3,085,354 A   4/1963 Rasmussen et al.
3,584,513 A   6/1971 Gates
(Continued)

FOREIGN PATENT DOCUMENTS

CN   101276415 A   10/2008
CN   201514511 U   6/2010
(Continued)

OTHER PUBLICATIONS

Statistical Modeling and Performance Characterization of a Real-Time Dual Camera Surveillance System, Greienhagen et al., Publisher: IEEE, 2000, 8 pages.
(Continued)

*Primary Examiner* — Clayton E. LaBalle
*Assistant Examiner* — Warren K Fenwick
(74) *Attorney, Agent, or Firm* — Nathan & Associates; Menachem Nathan

(57) ABSTRACT

Folded cameras and dual folded-upright cameras that reduce a mobile electronic device and specifically a smartphone bump footprint and height. In some examples, the bump footprint is reduced by reducing the height of a back focal plane section of the folded camera. In some examples, the bump footprint is reduced by reducing the height of a back focal plane section and a lens subsection of the folded camera.

15 Claims, 16 Drawing Sheets

SECTION A - A

(56) References Cited

U.S. PATENT DOCUMENTS

| | | |
|---|---|---|
| 3,941,001 A | 3/1976 | LaSarge |
| 4,199,785 A | 4/1980 | McCullough et al. |
| 4,792,822 A | 12/1988 | Akiyama et al. |
| 5,005,083 A | 4/1991 | Grage et al. |
| 5,032,917 A | 7/1991 | Aschwanden |
| 5,041,852 A | 8/1991 | Misawa et al. |
| 5,051,830 A | 9/1991 | von Hoessle |
| 5,099,263 A | 3/1992 | Matsumoto et al. |
| 5,248,971 A | 9/1993 | Mandl |
| 5,287,093 A | 2/1994 | Amano et al. |
| 5,331,465 A | 7/1994 | Miyano |
| 5,394,520 A | 2/1995 | Hall |
| 5,436,660 A | 7/1995 | Sakamoto |
| 5,444,478 A | 8/1995 | Lelong et al. |
| 5,459,520 A | 10/1995 | Sasaki |
| 5,502,537 A | 3/1996 | Utagawa |
| 5,657,402 A | 8/1997 | Bender et al. |
| 5,682,198 A | 10/1997 | Katayama et al. |
| 5,768,443 A | 6/1998 | Michael et al. |
| 5,892,855 A | 4/1999 | Kakinami et al. |
| 5,926,190 A | 7/1999 | Turkowski et al. |
| 5,940,641 A | 8/1999 | McIntyre et al. |
| 5,982,951 A | 11/1999 | Katayama et al. |
| 6,101,334 A | 8/2000 | Fantone |
| 6,128,416 A | 10/2000 | Oura |
| 6,148,120 A | 11/2000 | Sussman |
| 6,201,533 B1 | 3/2001 | Rosenberg et al. |
| 6,208,765 B1 | 3/2001 | Bergen |
| 6,211,668 B1 | 4/2001 | Duesler et al. |
| 6,215,299 B1 | 4/2001 | Reynolds et al. |
| 6,222,359 B1 | 4/2001 | Duesler et al. |
| 6,268,611 B1 | 7/2001 | Pettersson et al. |
| 6,549,215 B2 | 4/2003 | Jouppi |
| 6,611,289 B1 | 8/2003 | Yu et al. |
| 6,643,416 B1 | 11/2003 | Daniels et al. |
| 6,650,368 B1 | 11/2003 | Doron |
| 6,680,748 B1 | 1/2004 | Monti |
| 6,714,665 B1 | 3/2004 | Hanna et al. |
| 6,724,421 B1 | 4/2004 | Glatt |
| 6,738,073 B2 | 5/2004 | Park et al. |
| 6,741,250 B1 | 5/2004 | Furlan et al. |
| 6,750,903 B1 | 6/2004 | Miyatake et al. |
| 6,778,207 B1 | 8/2004 | Lee et al. |
| 7,002,583 B2 | 2/2006 | Rabb, III |
| 7,015,954 B1 | 3/2006 | Foote et al. |
| 7,038,716 B2 | 5/2006 | Klein et al. |
| 7,199,348 B2 | 4/2007 | Olsen et al. |
| 7,206,136 B2 | 4/2007 | Labaziewicz et al. |
| 7,248,294 B2 | 7/2007 | Slatter |
| 7,256,944 B2 | 8/2007 | Labaziewicz et al. |
| 7,305,180 B2 | 12/2007 | Labaziewicz et al. |
| 7,339,621 B2 | 3/2008 | Fortier |
| 7,346,217 B1 | 3/2008 | Gold, Jr. |
| 7,365,793 B2 | 4/2008 | Cheatle et al. |
| 7,411,610 B2 | 8/2008 | Doyle |
| 7,424,218 B2 | 9/2008 | Baudisch et al. |
| 7,509,041 B2 | 3/2009 | Hosono |
| 7,533,819 B2 | 5/2009 | Barkan et al. |
| 7,619,683 B2 | 11/2009 | Davis |
| 7,738,016 B2 | 6/2010 | Toyofuku |
| 7,773,121 B1 | 8/2010 | Huntsberger et al. |
| 7,809,256 B2 | 10/2010 | Kuroda et al. |
| 7,880,776 B2 | 2/2011 | LeGall et al. |
| 7,918,398 B2 | 4/2011 | Li et al. |
| 7,964,835 B2 | 6/2011 | Olsen et al. |
| 7,978,239 B2 | 7/2011 | Deever et al. |
| 8,115,825 B2 | 2/2012 | Culbert et al. |
| 8,149,327 B2 | 4/2012 | Lin et al. |
| 8,154,610 B2 | 4/2012 | Jo et al. |
| 8,238,695 B1 | 8/2012 | Davey et al. |
| 8,274,552 B2 | 9/2012 | Dahi et al. |
| 8,390,729 B2 | 3/2013 | Long et al. |
| 8,391,697 B2 | 3/2013 | Cho et al. |
| 8,400,555 B1 | 3/2013 | Georgiev et al. |
| 8,439,265 B2 | 5/2013 | Ferren et al. |
| 8,446,484 B2 | 5/2013 | Muukki et al. |
| 8,483,452 B2 | 7/2013 | Ueda et al. |
| 8,514,491 B2 | 8/2013 | Duparre |
| 8,547,389 B2 | 10/2013 | Hoppe et al. |
| 8,553,106 B2 | 10/2013 | Scarff |
| 8,587,691 B2 | 11/2013 | Takane |
| 8,619,148 B1 | 12/2013 | Watts et al. |
| 8,752,969 B1 | 6/2014 | Kane et al. |
| 8,803,990 B2 | 8/2014 | Smith |
| 8,896,655 B2 | 11/2014 | Mauchly et al. |
| 8,976,255 B2 | 3/2015 | Matsuoto et al. |
| 9,019,387 B2 | 4/2015 | Nakano |
| 9,025,073 B2 | 5/2015 | Attar et al. |
| 9,025,077 B2 | 5/2015 | Attar et al. |
| 9,041,835 B2 | 5/2015 | Honda |
| 9,137,447 B2 | 9/2015 | Shibuno |
| 9,185,291 B1 | 11/2015 | Shabtay et al. |
| 9,215,377 B2 | 12/2015 | Sokeila et al. |
| 9,215,385 B2 | 12/2015 | Luo |
| 9,270,875 B2 | 2/2016 | Brisedoux et al. |
| 9,286,680 B1 | 3/2016 | Jiang et al. |
| 9,344,626 B2 | 5/2016 | Silverstein et al. |
| 9,360,671 B1 | 6/2016 | Zhou |
| 9,369,621 B2 | 6/2016 | Malone et al. |
| 9,413,930 B2 | 8/2016 | Geerds |
| 9,413,984 B2 | 8/2016 | Attar et al. |
| 9,420,180 B2 | 8/2016 | Jin |
| 9,438,792 B2 | 9/2016 | Nakada et al. |
| 9,485,432 B1 | 11/2016 | Medasani et al. |
| 9,578,257 B2 | 2/2017 | Attar et al. |
| 9,618,748 B2 | 4/2017 | Munger et al. |
| 9,681,057 B2 | 6/2017 | Attar et al. |
| 9,723,220 B2 | 8/2017 | Sugie |
| 9,736,365 B2 | 8/2017 | Laroia |
| 9,736,391 B2 | 8/2017 | Du et al. |
| 9,768,310 B2 | 9/2017 | Ahn et al. |
| 9,800,798 B2 | 10/2017 | Ravirala et al. |
| 9,851,803 B2 | 12/2017 | Fisher et al. |
| 9,894,287 B2 | 2/2018 | Qian et al. |
| 9,900,522 B2 | 2/2018 | Lu |
| 9,927,600 B2 | 3/2018 | Goldenberg et al. |
| 11,333,955 B2 * | 5/2022 | Shabtay ............ G02B 13/0065 |
| 11,619,864 B2 * | 4/2023 | Shabtay ............ G02B 27/0018 396/155 |
| 2002/0005902 A1 | 1/2002 | Yuen |
| 2002/0030163 A1 | 3/2002 | Zhang |
| 2002/0054214 A1 | 5/2002 | Yoshikawa |
| 2002/0063711 A1 | 5/2002 | Park et al. |
| 2002/0075258 A1 | 6/2002 | Park et al. |
| 2002/0122113 A1 | 9/2002 | Foote |
| 2002/0167741 A1 | 11/2002 | Koiwai et al. |
| 2003/0030729 A1 | 2/2003 | Prentice et al. |
| 2003/0093805 A1 | 5/2003 | Gin |
| 2003/0156751 A1 | 8/2003 | Lee et al. |
| 2003/0160886 A1 | 8/2003 | Misawa et al. |
| 2003/0202113 A1 | 10/2003 | Yoshikawa |
| 2004/0008773 A1 | 1/2004 | Itokawa |
| 2004/0012683 A1 | 1/2004 | Yamasaki et al. |
| 2004/0017386 A1 | 1/2004 | Liu et al. |
| 2004/0027367 A1 | 2/2004 | Pilu |
| 2004/0061788 A1 | 4/2004 | Bateman |
| 2004/0141065 A1 | 7/2004 | Hara et al. |
| 2004/0141086 A1 | 7/2004 | Mihara |
| 2004/0239313 A1 | 12/2004 | Godkin |
| 2004/0240052 A1 | 12/2004 | Minefuji et al. |
| 2005/0013509 A1 | 1/2005 | Samadani |
| 2005/0046740 A1 | 3/2005 | Davis |
| 2005/0134697 A1 | 6/2005 | Mikkonen et al. |
| 2005/0141390 A1 | 6/2005 | Lee et al. |
| 2005/0157184 A1 | 7/2005 | Nakanishi et al. |
| 2005/0168834 A1 | 8/2005 | Matsumoto et al. |
| 2005/0185049 A1 | 8/2005 | Iwai et al. |
| 2005/0200718 A1 | 9/2005 | Lee |
| 2005/0248667 A1 | 11/2005 | Schweng et al. |
| 2006/0054782 A1 | 3/2006 | Olsen et al. |
| 2006/0056056 A1 | 3/2006 | Ahiska et al. |
| 2006/0067672 A1 | 3/2006 | Washisu et al. |
| 2006/0102907 A1 | 5/2006 | Lee et al. |
| 2006/0125937 A1 | 6/2006 | LeGall et al. |

(56) References Cited

U.S. PATENT DOCUMENTS

| | | |
|---|---|---|
| 2006/0126737 A1 | 6/2006 | Boice et al. |
| 2006/0170793 A1 | 8/2006 | Pasquarette et al. |
| 2006/0175549 A1 | 8/2006 | Miller et al. |
| 2006/0181619 A1 | 8/2006 | Liow et al. |
| 2006/0187310 A1 | 8/2006 | Janson et al. |
| 2006/0187322 A1 | 8/2006 | Janson et al. |
| 2006/0187338 A1 | 8/2006 | May et al. |
| 2006/0227236 A1 | 10/2006 | Pak |
| 2007/0024737 A1 | 2/2007 | Nakamura et al. |
| 2007/0126911 A1 | 6/2007 | Nanjo |
| 2007/0127040 A1 | 6/2007 | Davidovici |
| 2007/0159344 A1 | 7/2007 | Kisacanin |
| 2007/0177025 A1 | 8/2007 | Kopet et al. |
| 2007/0188653 A1 | 8/2007 | Pollock et al. |
| 2007/0189386 A1 | 8/2007 | Imagawa et al. |
| 2007/0257184 A1 | 11/2007 | Olsen et al. |
| 2007/0285550 A1 | 12/2007 | Son |
| 2008/0017557 A1 | 1/2008 | Witdouck |
| 2008/0024614 A1 | 1/2008 | Li et al. |
| 2008/0025634 A1 | 1/2008 | Border et al. |
| 2008/0030592 A1 | 2/2008 | Border et al. |
| 2008/0030611 A1 | 2/2008 | Jenkins |
| 2008/0084484 A1 | 4/2008 | Ochi et al. |
| 2008/0088942 A1 | 4/2008 | Seo |
| 2008/0106629 A1 | 5/2008 | Kurtz et al. |
| 2008/0117316 A1 | 5/2008 | Orimoto |
| 2008/0129831 A1 | 6/2008 | Cho et al. |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border et al. |
| 2009/0086074 A1 | 4/2009 | Li et al. |
| 2009/0102948 A1 | 4/2009 | Scherling |
| 2009/0109556 A1 | 4/2009 | Shimizu et al. |
| 2009/0122195 A1 | 5/2009 | Van Baar et al. |
| 2009/0122406 A1 | 5/2009 | Rouvinen et al. |
| 2009/0128644 A1 | 5/2009 | Camp et al. |
| 2009/0168135 A1 | 7/2009 | Yu et al. |
| 2009/0200451 A1 | 8/2009 | Conners |
| 2009/0219547 A1 | 9/2009 | Kauhanen et al. |
| 2009/0234542 A1 | 9/2009 | Orlewski |
| 2009/0252484 A1 | 10/2009 | Hasuda et al. |
| 2009/0295949 A1 | 12/2009 | Ojala |
| 2009/0324135 A1 | 12/2009 | Kondo et al. |
| 2010/0013906 A1 | 1/2010 | Border et al. |
| 2010/0020221 A1 | 1/2010 | Tupman et al. |
| 2010/0060746 A9 | 3/2010 | Olsen et al. |
| 2010/0097444 A1 | 4/2010 | Lablans |
| 2010/0103194 A1 | 4/2010 | Chen et al. |
| 2010/0134621 A1 | 6/2010 | Namkoong et al. |
| 2010/0165131 A1 | 7/2010 | Makimoto et al. |
| 2010/0196001 A1 | 8/2010 | Ryynänen et al. |
| 2010/0202068 A1 | 8/2010 | Ito |
| 2010/0238327 A1 | 9/2010 | Griffith et al. |
| 2010/0246024 A1 | 9/2010 | Aoki et al. |
| 2010/0259836 A1 | 10/2010 | Kang et al. |
| 2010/0265331 A1 | 10/2010 | Tanaka |
| 2010/0283842 A1 | 11/2010 | Guissin et al. |
| 2010/0321494 A1 | 12/2010 | Peterson et al. |
| 2011/0058320 A1 | 3/2011 | Kim et al. |
| 2011/0063417 A1 | 3/2011 | Peters et al. |
| 2011/0063446 A1 | 3/2011 | McMordie et al. |
| 2011/0064327 A1 | 3/2011 | Dagher et al. |
| 2011/0080487 A1 | 4/2011 | Venkataraman et al. |
| 2011/0121666 A1 | 5/2011 | Park et al. |
| 2011/0128288 A1 | 6/2011 | Petrou et al. |
| 2011/0164172 A1 | 7/2011 | Shintani et al. |
| 2011/0221599 A1 | 9/2011 | Högasten |
| 2011/0229054 A1 | 9/2011 | Weston et al. |
| 2011/0234798 A1 | 9/2011 | Chou |
| 2011/0234853 A1 | 9/2011 | Hayashi et al. |
| 2011/0234881 A1 | 9/2011 | Wakabayashi et al. |
| 2011/0242286 A1 | 10/2011 | Pace et al. |
| 2011/0242355 A1 | 10/2011 | Goma et al. |
| 2011/0285714 A1 | 11/2011 | Swic et al. |
| 2011/0298966 A1 | 12/2011 | Kirschstein et al. |
| 2012/0014682 A1 | 1/2012 | David et al. |
| 2012/0026366 A1 | 2/2012 | Golan et al. |
| 2012/0044372 A1 | 2/2012 | Cote et al. |
| 2012/0062780 A1 | 3/2012 | Morihisa |
| 2012/0069235 A1 | 3/2012 | Imai |
| 2012/0075489 A1 | 3/2012 | Nishihara |
| 2012/0105579 A1 | 5/2012 | Jeon et al. |
| 2012/0124525 A1 | 5/2012 | Kang |
| 2012/0154547 A1 | 6/2012 | Aizawa |
| 2012/0154614 A1 | 6/2012 | Moriya et al. |
| 2012/0196648 A1 | 8/2012 | Havens et al. |
| 2012/0229663 A1 | 9/2012 | Nelson et al. |
| 2012/0249815 A1 | 10/2012 | Bohn et al. |
| 2012/0287315 A1 | 11/2012 | Huang et al. |
| 2012/0320467 A1 | 12/2012 | Baik et al. |
| 2013/0002928 A1 | 1/2013 | Imai |
| 2013/0016427 A1 | 1/2013 | Sugawara |
| 2013/0063629 A1 | 3/2013 | Webster et al. |
| 2013/0076922 A1 | 3/2013 | Shihoh et al. |
| 2013/0093842 A1 | 4/2013 | Yahata |
| 2013/0094126 A1 | 4/2013 | Rappoport et al. |
| 2013/0113894 A1 | 5/2013 | Mirlay |
| 2013/0135445 A1 | 5/2013 | Dahi et al. |
| 2013/0148215 A1 | 6/2013 | Mori et al. |
| 2013/0148854 A1 | 6/2013 | Wang et al. |
| 2013/0155176 A1 | 6/2013 | Paripally et al. |
| 2013/0163085 A1 | 6/2013 | Lim et al. |
| 2013/0182150 A1 | 7/2013 | Asakura |
| 2013/0201360 A1 | 8/2013 | Song |
| 2013/0202273 A1 | 8/2013 | Ouedraogo et al. |
| 2013/0229544 A1 | 9/2013 | Bando |
| 2013/0235224 A1 | 9/2013 | Park et al. |
| 2013/0250150 A1 | 9/2013 | Malone et al. |
| 2013/0258044 A1 | 10/2013 | Betts-LaCroix |
| 2013/0258048 A1 | 10/2013 | Wang et al. |
| 2013/0270419 A1 | 10/2013 | Singh et al. |
| 2013/0278785 A1 | 10/2013 | Nomura et al. |
| 2013/0286221 A1 | 10/2013 | Shechtman et al. |
| 2013/0321668 A1 | 12/2013 | Kamath |
| 2014/0009631 A1 | 1/2014 | Topliss |
| 2014/0049615 A1 | 2/2014 | Uwagawa |
| 2014/0118584 A1 | 5/2014 | Lee et al. |
| 2014/0160311 A1 | 6/2014 | Hwang et al. |
| 2014/0192224 A1 | 7/2014 | Laroia |
| 2014/0192238 A1 | 7/2014 | Attar et al. |
| 2014/0192253 A1 | 7/2014 | Laroia |
| 2014/0218587 A1 | 8/2014 | Shah |
| 2014/0313316 A1 | 10/2014 | Olsson et al. |
| 2014/0362242 A1 | 12/2014 | Takizawa |
| 2014/0376090 A1 | 12/2014 | Terajima |
| 2014/0379103 A1 | 12/2014 | Ishikawa et al. |
| 2015/0002683 A1 | 1/2015 | Hu et al. |
| 2015/0002684 A1 | 1/2015 | Kuchiki |
| 2015/0042870 A1 | 2/2015 | Chan et al. |
| 2015/0070781 A1 | 3/2015 | Cheng et al. |
| 2015/0092066 A1 | 4/2015 | Geiss et al. |
| 2015/0103147 A1 | 4/2015 | Ho et al. |
| 2015/0110345 A1 | 4/2015 | Weichselbaum |
| 2015/0124059 A1 | 5/2015 | Georgiev et al. |
| 2015/0138381 A1 | 5/2015 | Ahn |
| 2015/0145965 A1 | 5/2015 | Livyatan et al. |
| 2015/0154776 A1 | 6/2015 | Zhang et al. |
| 2015/0162048 A1 | 6/2015 | Hirata et al. |
| 2015/0195458 A1 | 7/2015 | Nakayama et al. |
| 2015/0198464 A1 | 7/2015 | El Alami |
| 2015/0215516 A1 | 7/2015 | Dolgin |
| 2015/0237280 A1 | 8/2015 | Choi et al. |
| 2015/0242994 A1 | 8/2015 | Shen |
| 2015/0244906 A1 | 8/2015 | Wu et al. |
| 2015/0253543 A1 | 9/2015 | Mercado |
| 2015/0253647 A1 | 9/2015 | Mercado |
| 2015/0261299 A1 | 9/2015 | Wajs |
| 2015/0271471 A1 | 9/2015 | Hsieh et al. |
| 2015/0281678 A1 | 10/2015 | Park et al. |
| 2015/0286033 A1 | 10/2015 | Osborne |
| 2015/0296112 A1 | 10/2015 | Park et al. |
| 2015/0316744 A1 | 11/2015 | Chen |
| 2015/0334309 A1 | 11/2015 | Peng et al. |

(56) References Cited

U.S. PATENT DOCUMENTS

| | | | |
|---|---|---|---|
| 2016/0044250 A1 | 2/2016 | Shabtay et al. | |
| 2016/0070088 A1 | 3/2016 | Koguchi | |
| 2016/0154066 A1 | 6/2016 | Hioka et al. | |
| 2016/0154202 A1 | 6/2016 | Wippermann et al. | |
| 2016/0154204 A1 | 6/2016 | Lim et al. | |
| 2016/0212358 A1 | 7/2016 | Shikata | |
| 2016/0212418 A1 | 7/2016 | Demirdjian et al. | |
| 2016/0238834 A1 | 8/2016 | Erlich et al. | |
| 2016/0241751 A1 | 8/2016 | Park | |
| 2016/0291295 A1 | 10/2016 | Shabtay et al. | |
| 2016/0295112 A1 | 10/2016 | Georgiev et al. | |
| 2016/0301840 A1 | 10/2016 | Du et al. | |
| 2016/0301868 A1 | 10/2016 | Acharya et al. | |
| 2016/0342095 A1 | 11/2016 | Bieling et al. | |
| 2016/0353008 A1 | 12/2016 | Osborne | |
| 2016/0353012 A1 | 12/2016 | Kao et al. | |
| 2016/0381289 A1 | 12/2016 | Kim et al. | |
| 2017/0001577 A1 | 1/2017 | Seagraves et al. | |
| 2017/0019616 A1 | 1/2017 | Zhu et al. | |
| 2017/0070731 A1 | 3/2017 | Darling et al. | |
| 2017/0094187 A1 | 3/2017 | Sharma et al. | |
| 2017/0124987 A1 | 5/2017 | Kim et al. | |
| 2017/0150061 A1 | 5/2017 | Shabtay et al. | |
| 2017/0187962 A1 | 6/2017 | Lee et al. | |
| 2017/0214846 A1 | 7/2017 | Du et al. | |
| 2017/0214866 A1 | 7/2017 | Zhu et al. | |
| 2017/0219749 A1 | 8/2017 | Hou et al. | |
| 2017/0242225 A1 | 8/2017 | Fiske | |
| 2017/0276954 A1 | 9/2017 | Bajorins et al. | |
| 2017/0289458 A1 | 10/2017 | Song et al. | |
| 2018/0013944 A1 | 1/2018 | Evans, V et al. | |
| 2018/0017844 A1 | 1/2018 | Yu et al. | |
| 2018/0024329 A1 | 1/2018 | Goldenberg et al. | |
| 2018/0059379 A1 | 3/2018 | Chou | |
| 2018/0109660 A1 | 4/2018 | Yoon et al. | |
| 2018/0109710 A1 | 4/2018 | Lee et al. | |
| 2018/0120674 A1 | 5/2018 | Avivi et al. | |
| 2018/0150973 A1 | 5/2018 | Tang et al. | |
| 2018/0176426 A1 | 6/2018 | Wei et al. | |
| 2018/0184010 A1 | 6/2018 | Cohen et al. | |
| 2018/0198897 A1 | 7/2018 | Tang et al. | |
| 2018/0241922 A1 | 8/2018 | Baldwin et al. | |
| 2018/0295292 A1 | 10/2018 | Lee et al. | |
| 2018/0300901 A1 | 10/2018 | Wakai et al. | |
| 2018/0329281 A1 | 11/2018 | Ye | |
| 2018/0368656 A1 | 12/2018 | Austin et al. | |
| 2019/0100156 A1 | 4/2019 | Chung et al. | |
| 2019/0121103 A1 | 4/2019 | Bachar et al. | |
| 2019/0121216 A1 | 4/2019 | Shabtay et al. | |
| 2019/0130822 A1 | 5/2019 | Jung et al. | |
| 2019/0213712 A1 | 7/2019 | Lashdan et al. | |
| 2019/0215440 A1 | 7/2019 | Rivard et al. | |
| 2019/0222758 A1 | 7/2019 | Goldenberg et al. | |
| 2019/0228562 A1 | 7/2019 | Song | |
| 2019/0297238 A1 | 9/2019 | Klosterman | |
| 2020/0103726 A1 | 4/2020 | Shabtay et al. | |
| 2020/0104034 A1 | 4/2020 | Lee et al. | |
| 2020/0134848 A1 | 4/2020 | El-Khamy et al. | |
| 2020/0221026 A1 | 7/2020 | Fridman et al. | |
| 2020/0264403 A1 | 8/2020 | Bachar et al. | |
| 2020/0389580 A1 | 12/2020 | Kodama et al. | |
| 2021/0180989 A1 | 6/2021 | Fukumura et al. | |
| 2021/0333521 A9 | 10/2021 | Yedid et al. | |
| 2022/0252963 A1 | 8/2022 | Shabtay et al. | |

FOREIGN PATENT DOCUMENTS

| | | | |
|---|---|---|---|
| CN | 102215373 A | 10/2011 | |
| CN | 102739949 A | 10/2012 | |
| CN | 102982518 A | 3/2013 | |
| CN | 103024272 A | 4/2013 | |
| CN | 203406908 U | 1/2014 | |
| CN | 103841404 A | 6/2014 | |
| CN | 205301703 U | 6/2016 | |
| CN | 105827903 A | 8/2016 | |
| CN | 105847662 A | 8/2016 | |
| CN | 107608052 A | 1/2018 | |
| CN | 107682489 A | 2/2018 | |
| CN | 109729266 A | 5/2019 | |
| EP | 1536633 A1 | 6/2005 | |
| EP | 1780567 A1 | 5/2007 | |
| EP | 2523450 A1 | 11/2012 | |
| JP | S59191146 A | 10/1984 | |
| JP | 04211230 A | 8/1992 | |
| JP | H07318864 A | 12/1995 | |
| JP | 08271976 A | 10/1996 | |
| JP | 2002010276 A | 1/2002 | |
| JP | 2003298920 A | 10/2003 | |
| JP | 2003304024 A | 10/2003 | |
| JP | 2004056779 A | 2/2004 | |
| JP | 2004133054 A | 4/2004 | |
| JP | 2004245982 A | 9/2004 | |
| JP | 2005099265 A | 4/2005 | |
| JP | 2005122084 A | 5/2005 | |
| JP | 2005321592 A | 11/2005 | |
| JP | 2006237914 A | 9/2006 | |
| JP | 2006238325 A | 9/2006 | |
| JP | 2007228006 A | 9/2007 | |
| JP | 2007306282 A | 11/2007 | |
| JP | 2008076485 A | 4/2008 | |
| JP | 2008271026 A | 11/2008 | |
| JP | 2010204341 A | 9/2010 | |
| JP | 2011055246 A | 3/2011 | |
| JP | 2011085666 A | 4/2011 | |
| JP | 2011138407 A | 7/2011 | |
| JP | 2011203283 A | 10/2011 | |
| JP | 2012132739 A | 7/2012 | |
| JP | 2013101213 A | 5/2013 | |
| JP | 2013106289 A | 5/2013 | |
| JP | 2016105577 A | 6/2016 | |
| JP | 2017146440 A | 8/2017 | |
| KR | 20070005946 A | 1/2007 | |
| KR | 20090058229 A | 6/2009 | |
| KR | 20100008936 A | 1/2010 | |
| KR | 20110080590 A | 7/2011 | |
| KR | 20130104764 A | 9/2013 | |
| KR | 1020130135805 A | 11/2013 | |
| KR | 20140014787 A | 2/2014 | |
| KR | 101428042 B1 | 8/2014 | |
| KR | 101477178 B1 | 12/2014 | |
| KR | 20140144126 A | 12/2014 | |
| KR | 20150118012 A | 10/2015 | |
| KR | 20170105236 A | 9/2017 | |
| KR | 20180120894 A | 11/2018 | |
| KR | 20130085116 A | 6/2019 | |
| WO | 2000027131 A2 | 5/2000 | |
| WO | 2004084542 A1 | 9/2004 | |
| WO | 2006008805 A1 | 1/2006 | |
| WO | 2010122841 A1 | 10/2010 | |
| WO | 2014072818 A2 | 5/2014 | |
| WO | 2017025822 A1 | 2/2017 | |
| WO | 2017037688 A1 | 3/2017 | |
| WO | 2018130898 A1 | 7/2018 | |

OTHER PUBLICATIONS

A 3MPixel Multi-Aperture Image Sensor with 0.7μm Pixels in 0.11um CMOS, Fife et al., Stanford University, 2008, 3 pages.
Dual camera intelligent sensor for high definition 360 degrees surveillance, Scotti et al., Publisher: IET, May 9, 2000, 8 pages.
Dual-sensor foveated imaging system, Hua et al., Publisher: Optical Society of America, Jan. 14, 2008, 11 pages.
Defocus Video Matting, McGuire et al., Publisher: ACM SIGGRAPH, Jul. 31, 2005, 11 pages.
Compact multi-aperture imaging with high angular resolution, Santacana et al., Publisher: Optical Society of America, 2015, 10 pages.
Multi-Aperture Photography, Green et al., Publisher: Mitsubishi Electric Research Laboratories, Inc., Jul. 2007, 10 pages.
Multispectral Bilateral Video Fusion, Bennett et al., Publisher: IEEE, May 2007, 10 pages.
Super-resolution imaging using a camera array, Santacana et al., Publisher: Optical Society of America, 2014, 6 pages.

(56) References Cited

OTHER PUBLICATIONS

Optical Splitting Trees for High-Precision Monocular Imaging, McGuire et al., Publisher: IEEE, 2007, 11 pages.
High Performance Imaging Using Large Camera Arrays, Wilburn et al., Publisher: Association for Computing Machinery, Inc., 2005, 12 pages.
Real-time Edge-Aware Image Processing with the Bilateral Grid, Chen et al., Publisher: ACM SIGGRAPH, 2007, 9 pages.
Superimposed multi-resolution imaging, Carles et al., Publisher: Optical Society of America, 2017, 13 pages.
Viewfinder Alignment, Adams et al., Publisher: EUROGRAPHICS, 2008, 10 pages.
Dual-Camera System for Multi-Level Activity Recognition, Bodor et al., Publisher: IEEE, Oct. 2014, 6 pages.
Engineered to the task: Why camera-phone cameras are different, Giles Humpston, Publisher: Solid State Technology, Jun. 2009, 3 pages.

\* cited by examiner

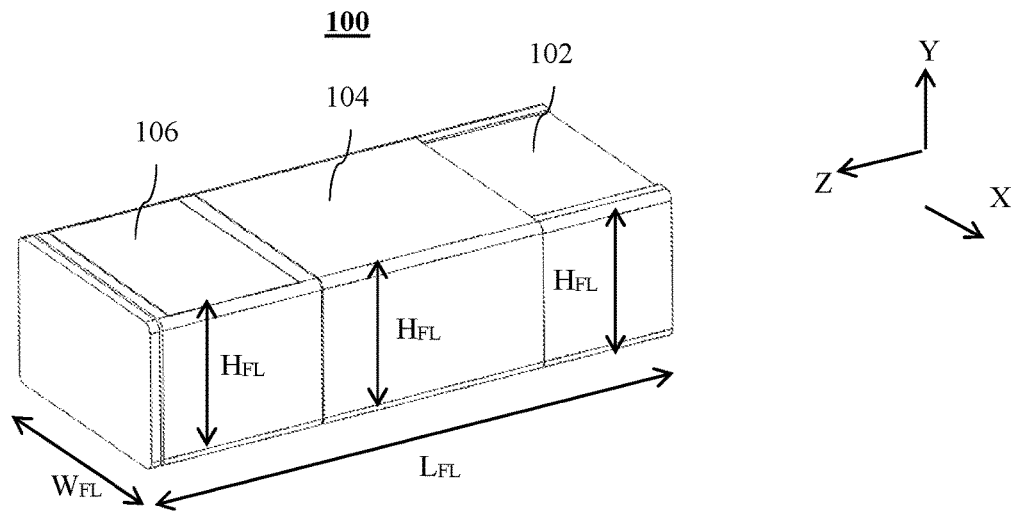
KNOWN ART
FIG. 1A
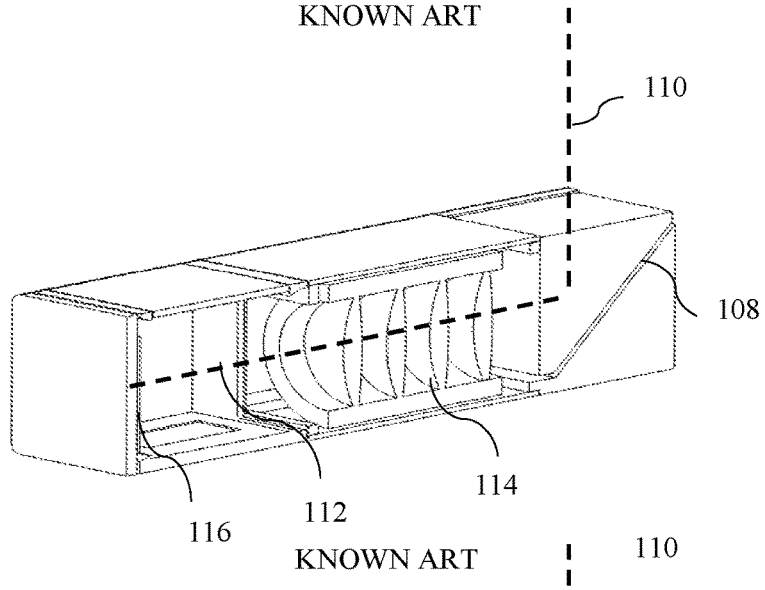
KNOWN ART
FIG. 1B
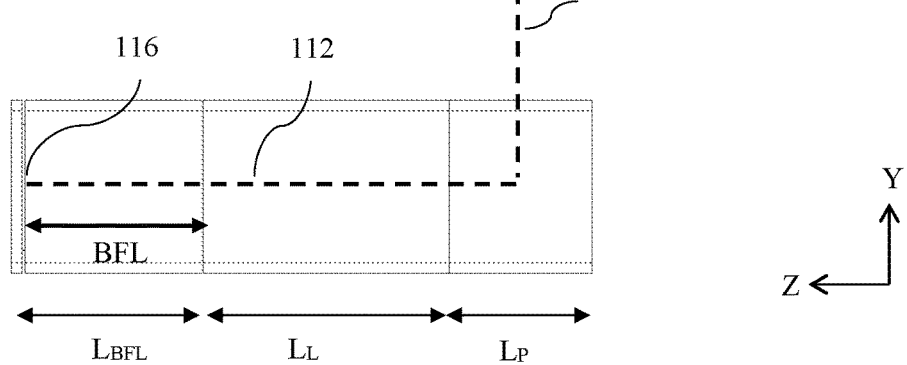
FIG. 1C  KNOWN ART

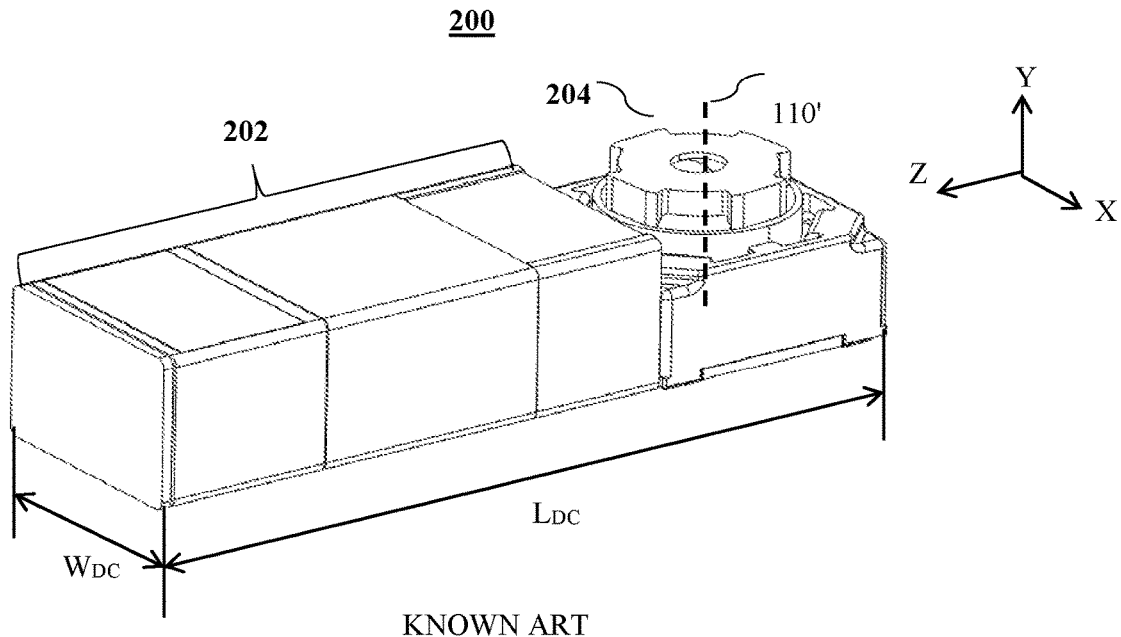
FIG. 2A  KNOWN ART
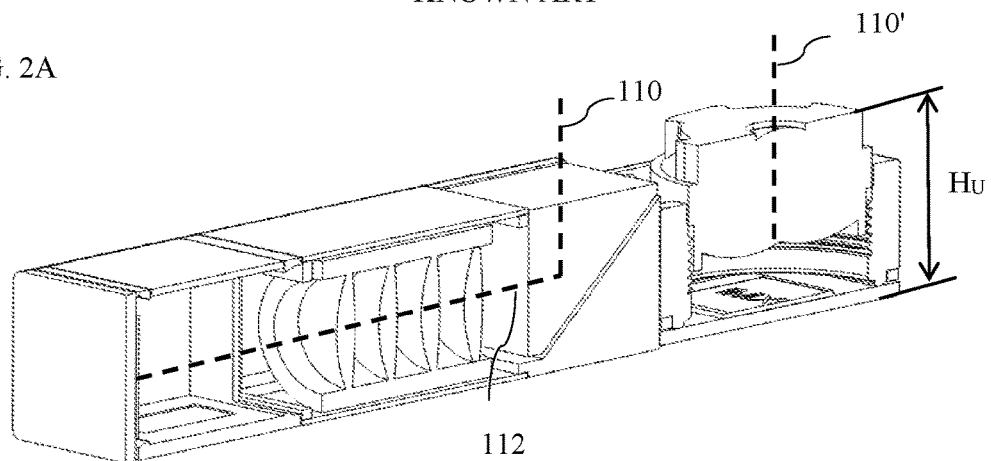
FIG. 2B  KNOWN ART
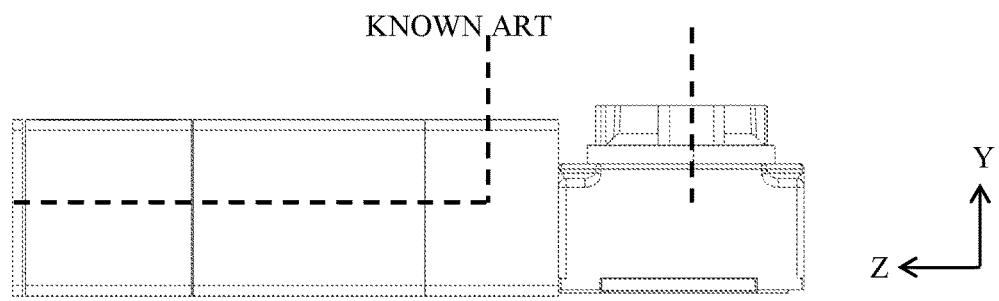
FIG. 2C  KNOWN ART

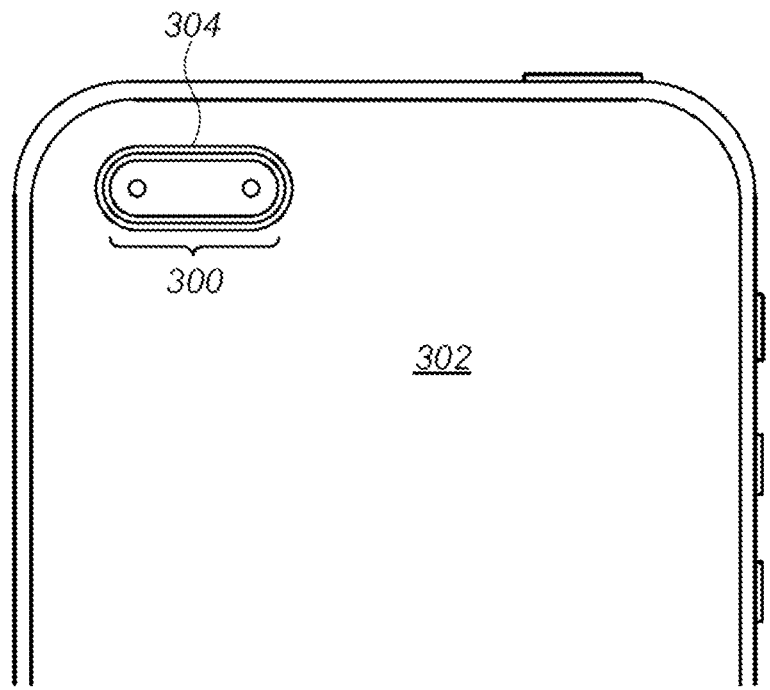
FIG. 3A KNOWN ART
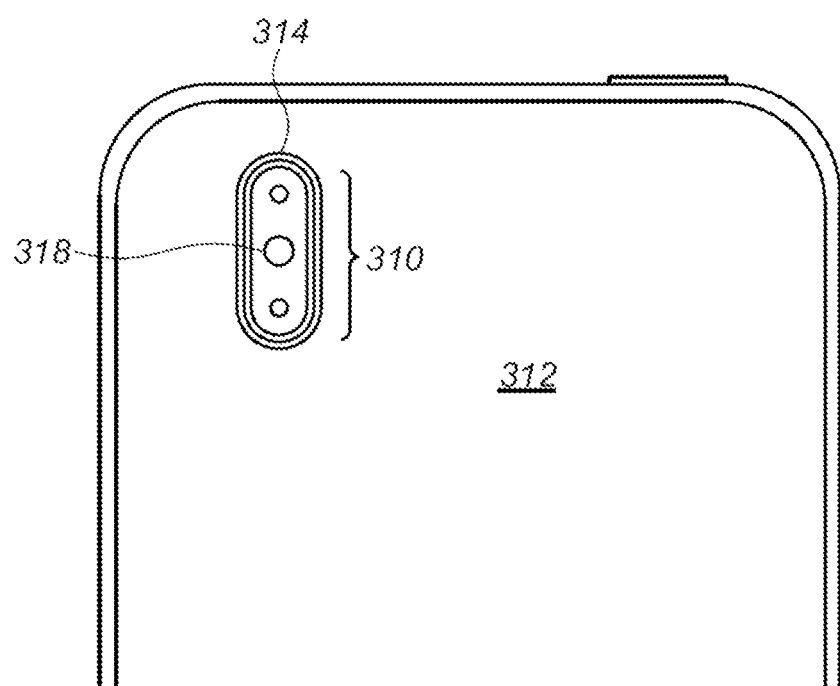
FIG. 3B KNOWN ART

SECTION A - A

KNOWN ART

SECTION A - A

COMPACT FOLDED CAMERA STRUCTURE

CROSS REFERENCE TO RELATED APPLICATIONS

This is a continuation of U.S. patent application Ser. No. 17/715,093 filed Apr. 7, 2022, which was a continuation of U.S. patent application Ser. No. 16/338,483 filed Mar. 31, 2019 (now U.S. patent Ser. No. 11/333,955), which was a 371 application for international patent application PCT/IB2018/058974 filed Nov. 14, 2018, and claims priority to U.S. provisional patent applications No. 62/590,324 filed Nov. 23, 2017, and No. 62/618,304 filed Jan. 17, 2018, both of which are incorporated herein by reference in their entirety.

FIELD

Embodiments disclosed herein relate in general to digital cameras and in particular folded cameras and dual folded-upright cameras incorporated in mobile electronic devices such as smartphones.

BACKGROUND

In recent years, mobile electronic devices such as cell-phones (and in particular smart-phones), tablets and laptops have become ubiquitous. Many of these devices include one or two compact "upright" cameras including, for example, a main rear-facing camera (i.e. a camera on the back side of the device, facing away from the user and often used for casual photography) and a secondary front-facing camera (i.e. a camera located on the front side of the device and often used for video conferencing). An important figure of merit in mobile phone cameras and in particular cell phone camera is the camera height or vertical distance of the camera or camera lens.

Although relatively compact in nature, the design of most of these cameras is similar to the traditional design of a digital still camera, i.e. it comprises a lens assembly (or a train of several optical elements) placed on top of an image sensor, which explains the term "upright". The lens assembly (also referred to as "lens module" or simply "lens") refracts the incoming light rays and bends them to create image data (or an "image") of a scene on the image sensor. The dimensions of these cameras are largely determined by the size of the sensor and by the height of the optics. These are usually tied together through the focal length ("f") of the lens and its field of view (FOV). That is, a lens that has to image a certain FOV on a sensor of a certain size has a specific focal length. In such cameras, an increase in the focal length typically results with an increase of the optics height.

Recently a folded camera structure (also referred to simply as "folded camera") has been suggested to reduce the height of a compact camera (see e.g. co-owned patent applications US 20160044250 and PCT/IB2016/052143, incorporated herein by reference in their entirety). In a folded camera, see FIGS. 1A-1C, an optical path folding element (referred to hereinafter as "OPFE" or "reflecting element") e.g. a prism or a mirror, is added in order to tilt the light propagation direction from substantially perpendicular to the mobile device back surface to substantially parallel to the mobile device back surface. For simplicity, a reflecting element will henceforth be referred to also as "OPFE". FIGS. 1A-1C show a known folded camera numbered 100 in various views. An orthogonal X-Y-Z coordinate ("axis") system is shown for the perspective views, FIGS. 1A and 1B. These coordinates apply to all following perspective views. Two of the coordinates are shown separately for the side view, FIG. 1C. These coordinates apply also to all following side views. The coordinate system shown is exemplary.

For the sake of clarity, the term "substantially" is used herein to imply the possibility of variations in values within an acceptable range. According to one example, the term "substantially" used herein should be interpreted to imply possible variation of up to 10% over or under any specified value. According to another example, the term "substantially" used herein should be interpreted to imply possible variation of up to 5% over or under any specified value. According to a further example, the term "substantially" used herein should be interpreted to imply possible variation of up to 2.5% over or under any specified value.

Camera 100 includes an OPFE section 102 with length $L_P$ and height $H_P$, a lens section 104 with length $L_L$ and a back focal length (BFL) section 106 with length $L_{BFL}$. In some embodiments, the partition to several parts is such that each part is fabricated separately, and all parts are glued together. In some embodiments, the partition to several part is only schematic, namely all parts are made as one in the fabrication process. The three sections have a substantially common height $H_{FL}$ (within 10% difference or less) which correspond roughly with a "camera height" of the folded camera. $H_{FL}$ is defined as the distance along axis Y (Y being the direction from the object to the camera, or parallel to first direction 110 introduced below) between external surfaces of the three sections, or, in the case the heights of the three sections are not exactly equal, the distance along axis Y between the external surfaces of the section with the largest height. In some examples, the range of values for $H_{FL}$ is 3-8 mm. In some examples, the range of values for $H_{FL}$ is 5-6 mm. OPFE section 102 includes an OPFE 108 that folds an optical path from a first direction (optical axis) 110 into a second direction (optical axis) 112. Lens section 104 includes a lens assembly 114 with one or more lens elements having a common optical axis parallel to second direction 112. BFL section 106 includes an image sensor (or simply "sensor") 116. BFL is equal to the distance between the exit surface (toward the sensor) of the lens element facing the sensor and the sensor itself. The folded camera has a length $L_{FL}$ and a width $W_{FL}$.

A folded camera may be assembled together with a regular "upright" camera into a dual-camera structure (also referred to herein as a "dual folded-upright camera" or simply "dual-camera") in a number of different ways, see e.g. co-owned international patent application PCT/IB2015/056004, incorporated herein by reference in its entirety. One example of a dual folded-upright camera is shown in FIGS. 2A-2C. These figures show a folded dual-camera numbered 200 in various views. Folded dual-camera 200 includes a folded camera 202 similar to camera 100 and an upright camera 204 with a height $H_U$ and an optical axis 110' parallel to first direction 110. The distance between optical axis 110' and first direction 110 is defined a baseline of folded dual camera 200. In the particular example shown, the two cameras lie along axis Z. The dual-camera has a length $L_{DC}$ and a width $W_{DC}$. The width $W_{DC}$ can be determined by the larger of the widths of the folded and upright cameras. Note that while in the example the folded and upright cameras are shown aligned along the Z axis, other arrangements, as shown for example, in co-owned PCT patent application PCT/IB2015/056004 (incorporated herein by reference in its entirety), are known and possible.

Dual-cameras with two upright cameras (also referred to herein as "dual upright-upright cameras") are known. Their incorporation in mobile electronic devices such as smartphones is also known, with dual upright-upright camera smartphones being sold commercially. FIG. 3A shows a known dual upright-upright camera numbered 300 included in a smartphone 302 in a back view. A trend in compact cameras is to allow the upright camera lens to protrude the top surface of the camera, such that the lens alone can have a larger height, while other parts of the camera are lower. This is often referred to as a "bump", numbered in FIG. 3A with numeral 304. Bumps above the surface of a smartphone and other mobile electronic devices are undesirable.

The use of light flash (e.g. LED flash) elements (or just "flash elements") in cameras is known. The positioning of flash elements inside the "bump" of an upright dual camera is known. FIG. 3B shows a known dual upright-upright camera numbered 310 included in a smartphone 312 in a back view, having a flash element 318 in the "bump" 314. Having a folded camera with a flash element in the bump is desired. It is desired to provide folded cameras and dual folded-upright cameras that improve upon the deficiencies of the prior art. It is desired to provide folded cameras and dual folded-upright cameras with a reduced bump footprint.

SUMMARY

Embodiments disclosed herein teach folded cameras and dual folded-upright cameras that reduce a mobile electronic device and specifically a smartphone bump footprint and height. In some examples, the bump footprint is reduced by reducing the height of a back focal plane section of the folded camera. In some examples, the bump footprint is reduced by reducing the height of a back focal plane section and a lens subsection of the folded camera.

As mentioned, it is desired to reduce and/or eliminate the surface area of the bump. It is desired for the bump not to extend past the height of the camera.

In some embodiments, there is provided a folded camera comprising an OPFE section including an OPFE for folding an optical path from a first direction to a second direction, the OPFE section having a OPFE height $H_P$ in the first direction, a lens section positioned between the OPFE and an image sensor, the lens section having at least one lens section height $H_L$ in the first direction, and a BFL section extending between the lens section and the image sensor and having a BFL section height $H_{BFL}$ in the first direction, wherein $H_{BFL}<H_L$.

In some embodiments described above or below, the lens section includes two subsections, wherein a lens subsection closer to the BFL section has a height $H_{L1}<H_L$.

In some embodiments described above or below, $H_{BFL}=H_{L1}$.

In some embodiments described above or below, $H_{BFL}<H_{L1}$ and $H_{BFL}<H_L$.

In some embodiments described above or below, the lens section has a width $W_L$ that fulfills the condition $W_L>H_L>H_{BFL}$.

In some embodiments described above or below, the BFL section has a top side and a bottom side, wherein the lens section has an optical axis parallel to the second direction and wherein the optical axis in the BFL section is closer to the top side of the BFL section than to the bottom side of the BFL section.

In some embodiments described above or below, the image sensor is positioned asymmetrically relative to a board it is mounted on.

In some embodiments described above or below, the top side has an internal surface structured to prevent stray light from being directed toward the image sensor.

In some embodiments described above or below, wherein the BFL section has a top side and a bottom side, wherein the lens section, BFL section and the image sensor share an optical axis, and wherein the optical axis in the BFL section is closer to the top side than to the bottom side, the positioning of the image sensor is asymmetrically relative to a board it is mounted on.

In some embodiments described above or below, wherein the top side has an internal surface structured to prevent stray light from being directed toward the image sensor.

In some embodiments described above or below, the folded camera further comprises a flash element positioned on the BFL section and having a height $H_{FLASH} \leq H_L$.

In some embodiments described above or below, the folded camera further comprises a flash element positioned on the lens subsection closer to the BFL section and having a height $H_{FLASH} \leq H_L$.

In some embodiments described above or below, the folded camera further comprises a flash element positioned partially on the BFL section and partially on the lens subsection closer to the BFL section and having a height $H_{FLASH} \leq H_L$.

In some embodiments described above or below, there are provided dual-aperture cameras comprising a folded camera as described above and below, together with an upright camera.

In some embodiments described above or below, the dual-aperture camera comprises a folded camera and an upright camera sharing a single axis in the second direction.

In some embodiments, a mobile electronic device comprises a folded camera described above or below.

In some embodiments described above or below, the mobile electronic device comprises a bump on a surface thereof, wherein the bump surrounds an area including the folded camera and wherein at least one bump dimension is defined by a folded camera dimension.

In some embodiments, a mobile electronic device comprises a dual-aperture camera described above or below.

In some embodiments described above or below, there are provided mobile electronic devices comprising a folded camera and/or a dual-camera as described above and below. In some embodiments, the mobile electronic device is a smartphone. The mobile electronic device may include a bump on a surface thereof, wherein the bump surrounds an area including the folded camera and/or an upright camera (for dual-cameras) and wherein at least one bump dimension is defined by a folded camera or dual-camera dimension.

Some embodiments include a method of manufacturing a folded camera, comprising providing an optical path folding element (OPFE) for folding an optical path from a first direction to a second direction, the OPFE section having an OPFE height $H_P$ in the first direction, providing a back focal length (BFL) section that includes an image sensor, the BFL section having a BFL section height $H_{BFL}$ in the first direction, providing a lens section having at least one lens, the lens section having a lens section height $H_L$ in the first direction, arranging the lens section between the BFL section and the OPFE along the first optical axis, wherein $H_{BFL}<H_L$.

In some embodiments described above or below, the OPFE section has a OPFE section height $H_P$ in the first direction, wherein $H_{BFL}<H_P$.

In some embodiments described above or below, the lens section has at least two subsections.

In some embodiments described above or below, a lens subsection closer to the BFL section has a height $H_{L1}$, wherein $H_{L1} < H_L$.

In some embodiments described above or below, $H_{BFL} \leq H_{L1}$ and $H_{BFL} < H_L$.

In some embodiments described above or below, the BFL section has a top side and a bottom side, wherein the lens section has an optical axis parallel to the second direction and wherein the optical axis in the BFL section is closer to the top side of the BFL section than to the bottom side of the BFL section.

In some embodiments described above or below, the BFL section has a top side and a bottom side, wherein the lens section, BFL section and the image sensor share an optical axis, and wherein the optical axis in the BFL section is closer to the top side than to the bottom side, positioning the image sensor asymmetrically relative to a board it is mounted on.

In some embodiments described above or below, a method includes asymmetrically placing an image sensor relative to the top and bottom of the BFL section.

Some embodiments include a method for reducing the bump footprint of a smartphone, the method comprising: providing a smartphone; attaching the folded camera of any of the above embodiments to an exterior surface of the smartphone, wherein the folded camera reduces the bump footprint of the smartphone.

In some embodiments described above or below, the bump footprint includes a length $L_{B1}$, a width $W_{B1}$, and a height $H_{B1}$, wherein $L_{B1}$ has a range of 5-50 mm, $W_{B1}$ has a range of 1-20 mm and $H_{B1}$ has a range of 0.05-3 mm.

In some embodiments described above or below, the lower height of the BFL section relative to the height of the lens section and/or the OPFE section enables a shorter bump length $L_{B1}$.

In some embodiments described above or below, a method includes incorporating a flash element into the bump footprint.

As set forth above, each of the embodiments may be used in combination with one another, as it is contemplated that various combinations of embodiments can be merged with one another and are part of the scope of the present disclosure.

As used herein, the terms "for example", "exemplarily", "such as", "for instance" and variants thereof describe non-limiting embodiments of the presently disclosed subject matter.

BRIEF DESCRIPTION OF THE DRAWINGS

Non-limiting examples of embodiments disclosed herein are described below with reference to figures attached hereto that are listed following this paragraph. Identical structures, elements or parts that appear in more than one figure may be labeled with the same numeral in the figures in which they appear. The drawings and descriptions are meant to illuminate and clarify embodiments disclosed herein, and should not be considered limiting in any way.

FIG. 1A shows a known folded camera in a perspective view;

FIG. 1B shows the folded camera of FIG. 1A in a longitudinal cross section view;

FIG. 1C shows the folded camera of FIG. 1A in a side view;

FIG. 2A shows a known dual upright-folded camera in a perspective view;

FIG. 2B shows the dual upright-folded camera of FIG. 2A in a longitudinal cross section view;

FIG. 2C shows the dual upright-folded camera of FIG. 2A in a side view;

FIG. 3A shows a known dual upright-upright camera included in a smartphone in a back view;

FIG. 3B shows a known upright-upright camera with flash included in a smartphone in a back view;

DETAILED DESCRIPTION

Folded cameras described herein comprise an optical path folding element (OPFE), a lens and an image sensor. Folded cameras may further include other parts required for operation, including a focusing mechanism, an optical image stabilization (OIS) mechanism, a zooming mechanism, a mechanical shield, an infra-red (IR) filter, electronics to operate focusing, a gyroscope, a shutter and/or other parts. Folded cameras may further include additional optical elements between the OPFE and the object to be photographed. The lens of folded cameras described herein may have constant focal length, or may have varying focal length (also known as "zoom lens").

A folded camera height is generally smaller than the height of an upright camera with a similar effective focal length (EFL). The decrease in the folded cameras height results from the fact that the folded camera height is not dependent on the lens height, which is correlated with the lens focal length. In an upright camera, its height is dependent on the lens height. Therefore, the lens focal length may be increased without sacrifice in the camera module height. However, the folded camera height is determined by lens assembly height and the height of other parts of the camera, for example an actuator (e.g. an actuator used to shift the lens for focus and\or optical image stabilization) and a shield height, and cannot be reduced beyond a certain minimum value, without sacrificing optical performance. In general, the height of folded cameras according to presently disclosed subject matter may be in the range of 3-8 mm.

Figure 4A:
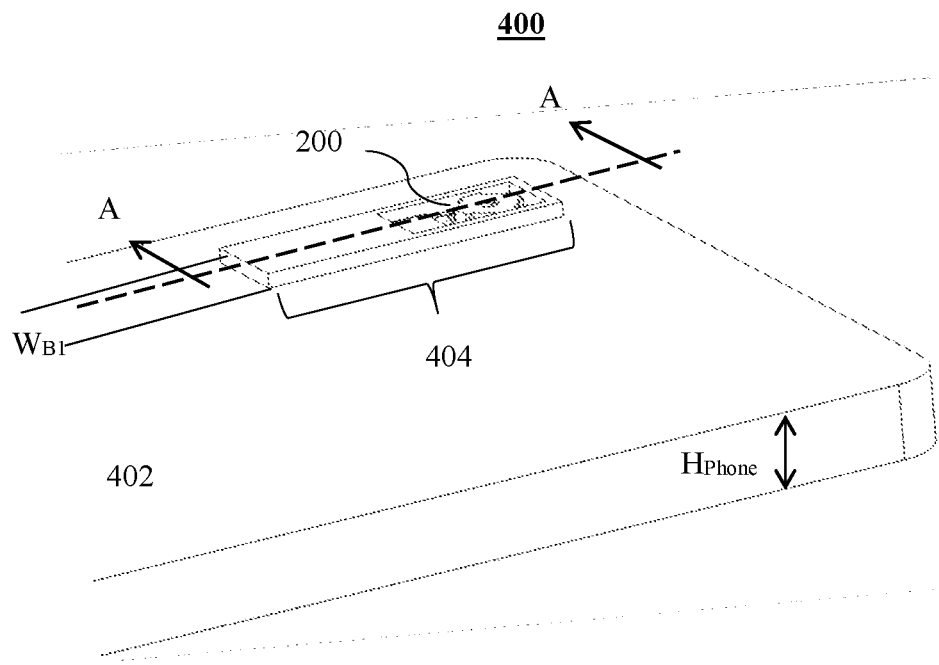
FIG. 4A shows a dual folded-upright camera of FIGS. 1A-1C included in a smartphone in a perspective view, according to an exemplary embodiment disclosed herein.
Figure 4B:
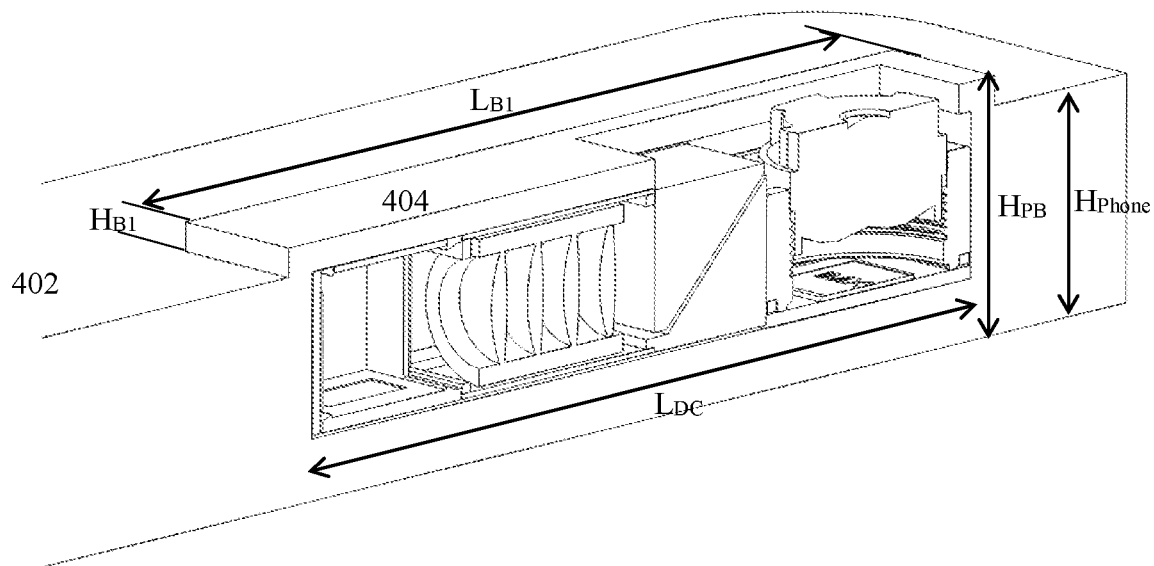
FIG. 4B shows a cross section with enlarged details of the dual-camera and the smartphone of FIG. 4A.

It is desirable that smartphones and other mobile electronic devices having cameras with one (or more) folded camera(s) and/or one (or more) upright camera(s) have a bump footprint (width and length) as small as possible. Independently, it would be desirable in such smartphones and/or mobile electronic devices to have a bump height as small as possible FIG. 4A shows a smartphone 400 comprising a dual folded-upright camera similar to camera 200 in a perspective view, according to an exemplary embodiment disclosed herein. FIG. 4B shows enlarged details of the dual-camera and the smartphone in a cross-section A-A. A bump 404 generally surrounding the dual-camera section protrudes above a surface of smartphone 402. The bump has a length $L_{B1}$, a width $W_{B1}$, and a height $H_{B1}$. In some examples $L_{B1}$ has a range of 5-50 mm, $W_{B1}$ has a range of 1-20 mm and $H_{B1}$ has a range of 0.05-3 mm. While its edges are shown as sharp, they are preferably rounded as in the bump of FIG. 3. By positioning the folded and upright cameras in a line (along a single axis), one can obtain a smaller bump footprint than, for example, positioning the folded and upright cameras in an arrangement in which the two do not share the same single axis. Note that everywhere except in the region of the bump, the phone has a thickness (height) between external surfaces $H_{Phone}$. In the region of the bump, the phone thickness is larger and marked $H_{PB}$.

The present inventors have found that the dimensions of a bump that accommodates a dual folded-upright camera may further be reduced by judicious design of the folded camera.

Figure 5A:
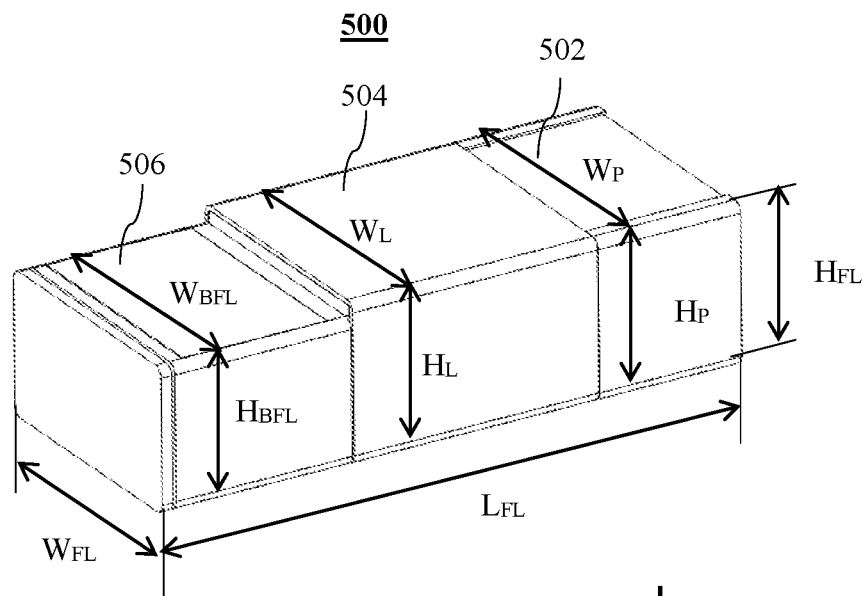
FIG. 5A shows a folded camera in a perspective view according to another exemplary embodiment disclosed herein.
Figure 5B:
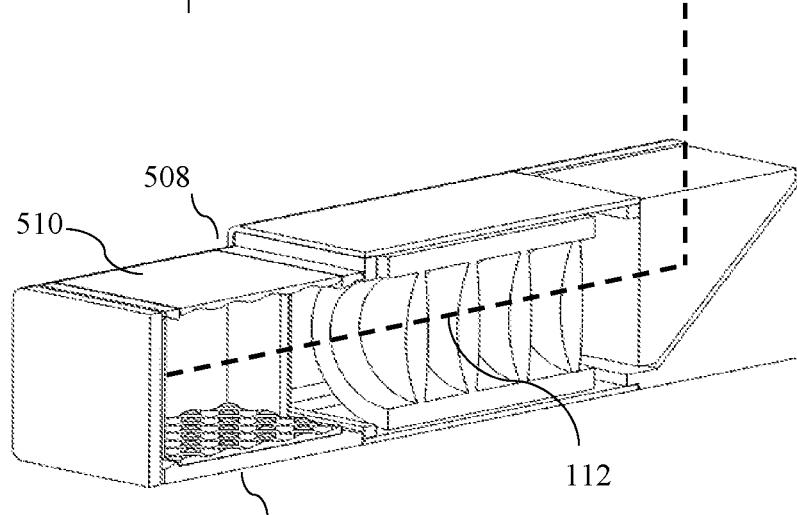
FIG. 5B shows the folded camera of FIG. 5A in a longitudinal cross section view.
Figure 5C:
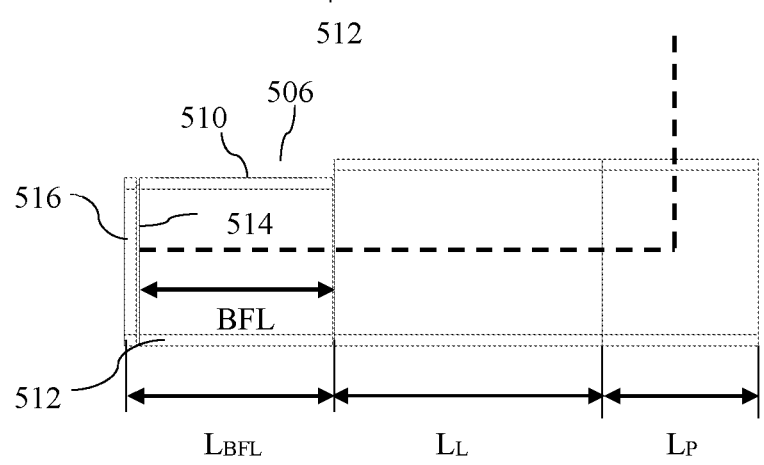
FIG. 5C shows the folded camera of FIG. 5A in a side view.

FIGS. 5A-5C show, in various views, a folded camera structure numbered 500 according to an exemplary embodiment disclosed herein. Like camera 100, camera 500 includes an OPFE section 502 with length $L_P$ and width $W_P$, a lens section 504 with length $L_L$ and width $W_L$ and a back focal length (BFL) section 506 with length $L_{BFL}$ and width $W_{BFL}$. Camera 500 may have a height $H_{FL}$, a length $L_{FL}$ and a width $W_{FL}$ similar to that of camera 100. $L_{FL}$ is defined by the sum of $L_P+L_L+L_{BFL}$. $L_P$ could basically be defined by the reflecting element height (for example a prism). In some examples according to presently disclosed subject matter, $H_{FL}$ is in the range of 3-8 mm, $L_{FL}$ is in the range of 10-30 mm and $W_{FL}$ is in the range of 3-15 mm. Note that the width of different folded camera sections may be different from each other and from $W_{FL}$. These camera height, length and width dimensions apply in following disclosed embodiments even if not shown in figures.

Camera 500 may include other components with respective functionalities similar to or identical with the components of camera 100. Therefore, these components and their respective functionalities are not described in detail. Further, camera 500 may include two BFL sections or a split BFL section. Unlike in camera 100, BFL section 506 in camera 500 has a height $H_{BFL}$ that is smaller than the height of the lens section $H_L$ and a height of the OPFE (for example a prism) section $H_P$. For example, $H_{BFL}$ may be smaller than $H_L$ by 0.05-3 mm. The reduction in height is expressed at a "shoulder" 508. In some examples, $H_L$ and $H_P$ may be substantially equal (up to 5% difference). In other examples, $H_L$ may be smaller than $H_P$. In some embodiments, camera 500 may have a lens section width $W_L$ which is larger than the lens section height $H_L$. In some embodiments, $W_L$ may be equal to $H_L$. In some embodiments, a lens accommodated in the lens section may have a shape with radial symmetry (for example a cylindrical shape). In some embodiments, a lens accommodated in the lens section may have shape which does not have radial symmetry (for example a rectangular shape, a cylinder with chamfers, etc.).

Figure 6A:
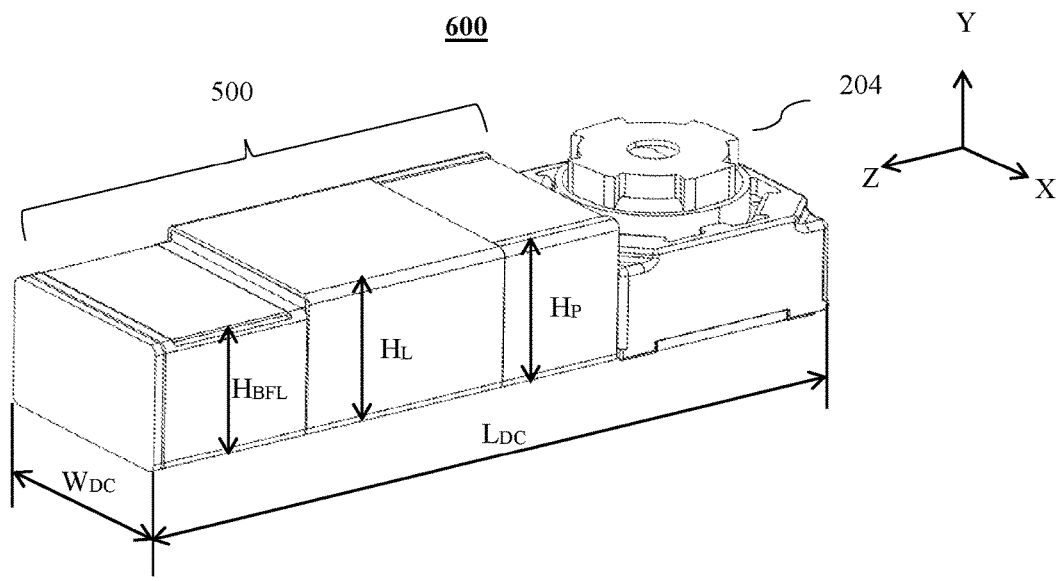
FIG. 6A shows a dual folded-upright camera in a perspective view according to another exemplary embodiment disclosed herein.
Figure 6B:
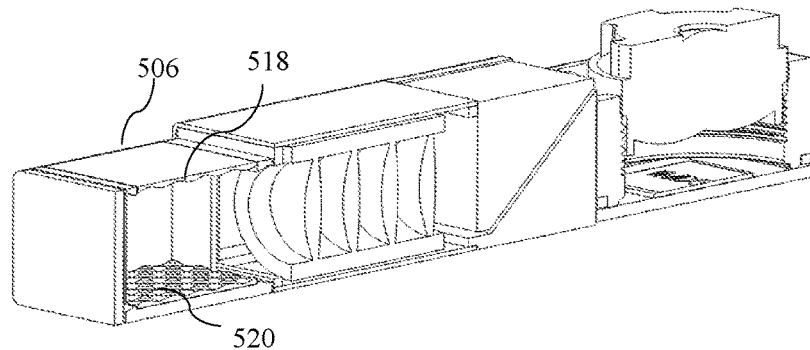
FIG. 6B shows the dual folded-upright camera of FIG. 6A in a longitudinal cross section view.
Figure 6C:
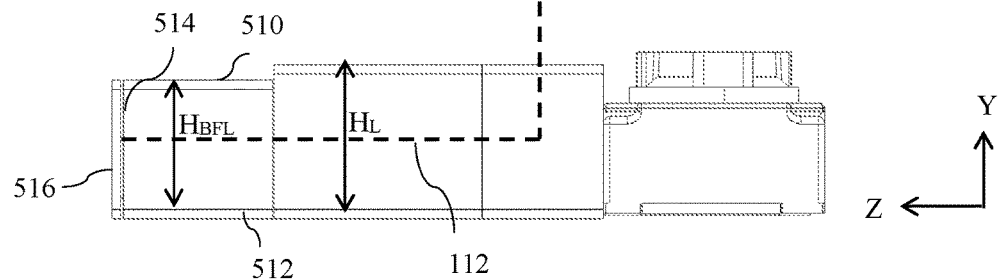
FIG. 6C shows the dual folded-upright camera of FIG. 6A in a side view.

Camera 500 can be included together with an upright camera 204 in a dual-camera 600 as shown in FIGS. 6A-6C. In the case of dual-camera, each of the two cameras may be called a "sub camera". In some examples, upright camera may have an optical axis 110' which is parallel to the first direction 110. The distance between optical axis 110' and first direction 110 is defined a baseline of folded dual-camera 600. In some examples, the length $L_{DC}$ and width $W_{DC}$ of dual-camera 600 remain similar to those of dual-camera 200. However, dual-camera 600 has a lower height $H_{BFL}$ in the BFL section 506 of the folded camera. Therefore, when dual-camera 600 is incorporated in a mobile device such as a smartphone 700, the lower height of the BFL section enables a shorter bump length.

Figure 7A:
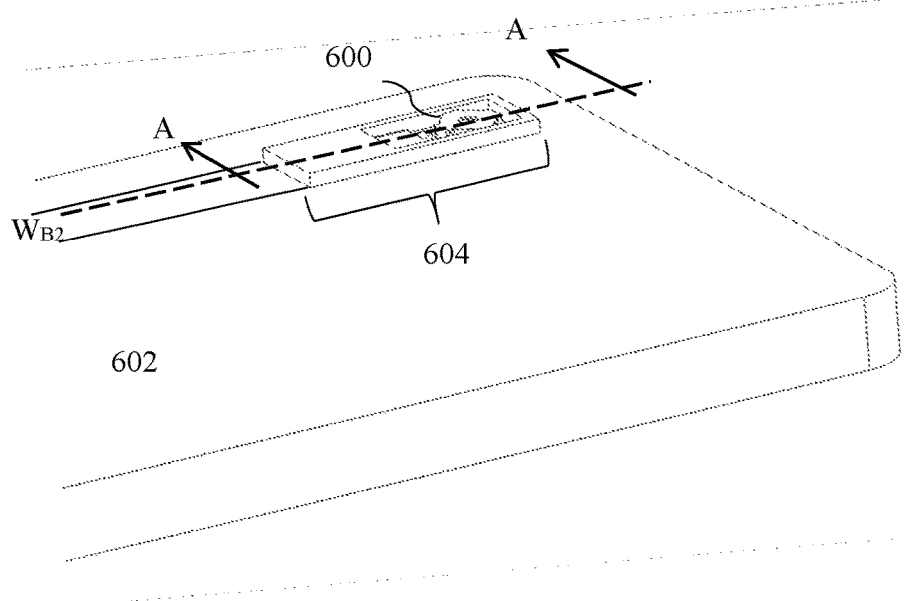
FIG. 7A shows the dual folded-upright camera of FIGS. 6A-6C included in a smartphone in a perspective view, according to an exemplary embodiment disclosed herein.
Figure 7B:
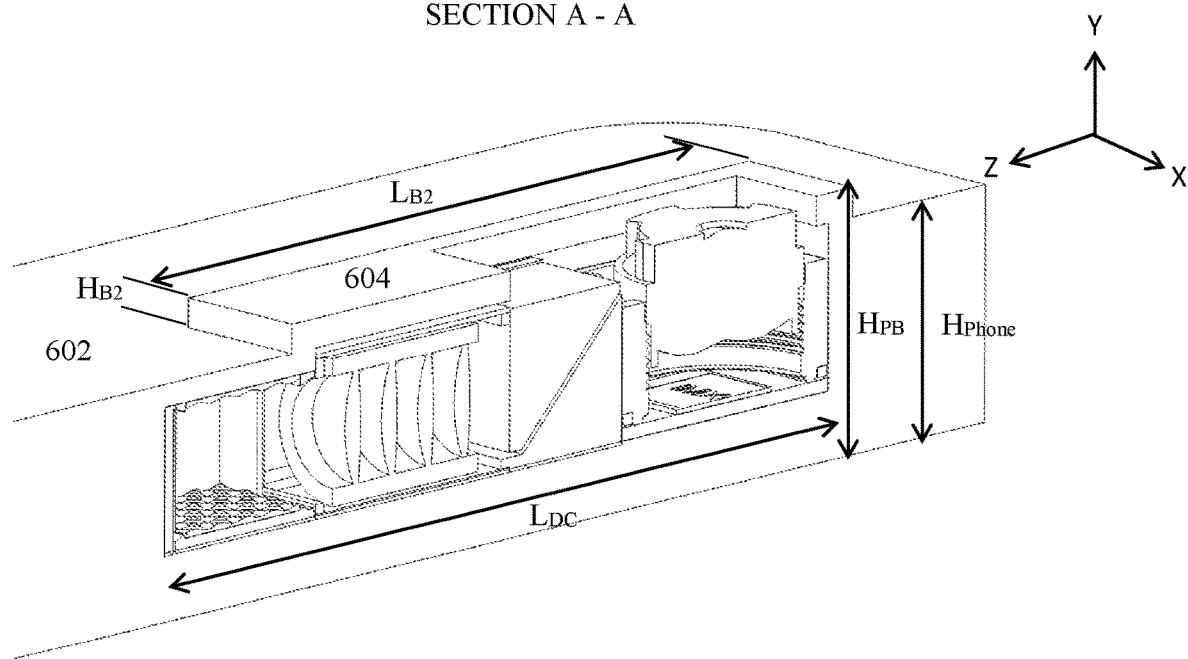
FIG. 7B shows a cross section with enlarged details of the dual folded-upright camera and the smartphone of FIG. 7A.

FIG. 7A shows the dual folded-upright camera of FIGS. 6A-6C included in a smartphone 700 in a perspective view. FIG. 7B shows a cross section with enlarged details of the dual folded-upright camera and the smartphone. Smartphone 700 has a bump 604 protruding over a surface 602. Bump 604 has a length $L_{B2}$ and a height $H_{B2}$. $L_{B2}$ is smaller than $L_{DC}$ by about the length of BFL section 506. In this example, the dual-camera components that protrude and are visible include only the top of the lens of the upright camera and top parts of the OPFE. In some examples, lens sections of the folded camera may also be visible. In general, a bump may be needed only in areas of the camera where a height of the upright camera and a height of a section of the folded camera is larger than $H_{phone}$.

Returning now to FIGS. 5A-5C, the reduction of height in the BFL section causes second direction 112 of the folded camera to be closer to a top surface 510 than to a bottom surface 512 of BFL section 506, creating asymmetry in the propagation of light rays exiting the lens into the BFL section. One result of the asymmetry is that an image sensor 514, which is normally mounted on a board 516 is asymmetrically positioned in the Y direction relative to the top and bottom sides of the BFL section and of the board itself.

Figure 8A:
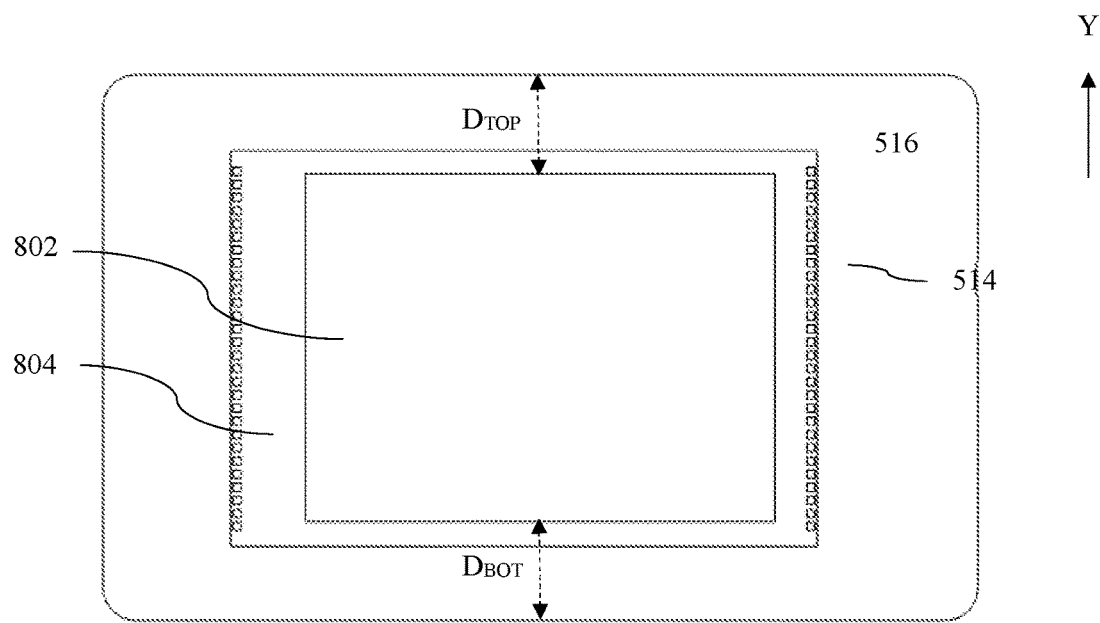
FIG. 8A shows a folded camera image sensor mounted on a board of a folded camera as in FIGS. 4A, 4B.

FIG. 8A shows a known art image sensor 514 and board 516 as viewed in a +Z direction (along second direction 112). Sensor 514 is, for example, a silicon die that has an optically active part 802 (referred hereafter as active part 802) surrounded by a part (auxiliary silicon logic) 804 considered "non-active" in terms of image\light sensing and referred to therefore as non-active part 804. Active part 802 may be located in non-active part 804 in any position symmetrically or asymmetrically, as known in the art. Active part 802 is distanced from the top and bottom of board 516 (i.e. in the Y direction shown) by distances marked as $D_{TOP}$ and $D_{BOT}$ respectively. In FIG. 8A, $D_{TOP}=D_{BOT}\pm\Delta$, where $\Delta$ is typically 0 to 200 m. This is a sensor-board arrangement in a known folded camera such as camera 100, where active part 802 is typically positioned symmetrically or slightly asymmetrically relative to board 516 ("slightly" referring to up to 200 μm out of the height (4-6 mm) or about 0-5% of the PCB height).

Figure 8B:
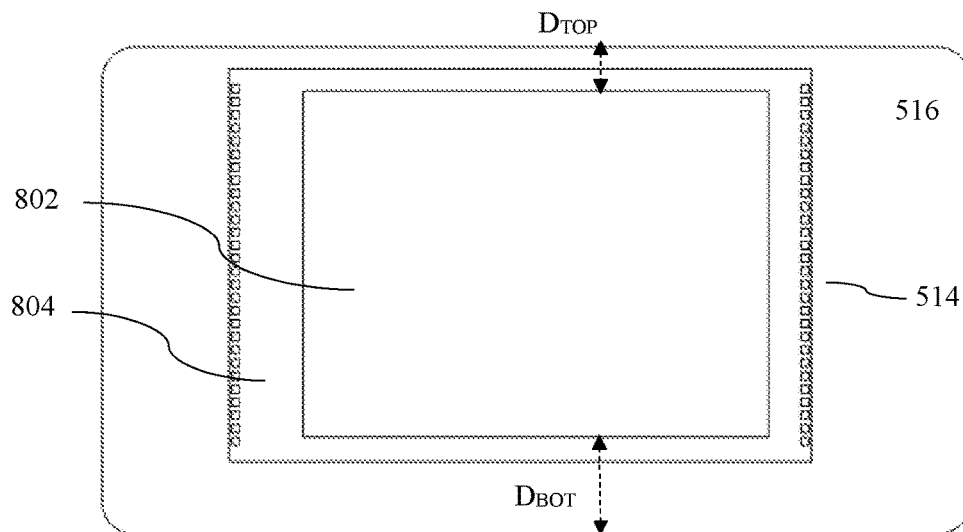
FIG. 8B shows a known folded camera image sensor mounted a board of a folded camera as in FIGS. 6A, 6B.

FIG. 8B shows an image sensor 514 and board 516 configuration 800 according to an embodiment disclosed herein. In configuration 800, active part 802 is positioned asymmetrically relative to board 516 in the Y direction, and A may be on the order of 100-1500 m. In this case, the asymmetry of active part 802 relative to board 516 may be on the order of 100 μm and up to 1-1.5 mm, or about 5%-30% of the PCB height.

The asymmetry results in a surface closer to the sensor's effective ray envelope and may cause stray light effects on the sensor. For example, in camera 500, top surface 510 is lower and closer to the sensor than a top surface of lens section 504, allowing for light that is entering to bounce off of top surface 510 and be redirected back to the sensor. To mitigate such effects, an internal surface 518 of top surface 510 of BFL section 506 is structured to prevent stray light. This may be provided, for example, by a yoke with a special structure and/or with an anti-reflective coating. Alternatively, an internal surface 520 of bottom 512 of BFL section 506 or both top and bottom internal surfaces 518 and 520 are structured to prevent stray light. In certain embodiments, internal surface 518 is uneven and/or has various ridges, so that it is not flat. Alternatively, FIG. 9B illustrates a method for absorbing or redistributing the light in other directions.

Figure 9A:
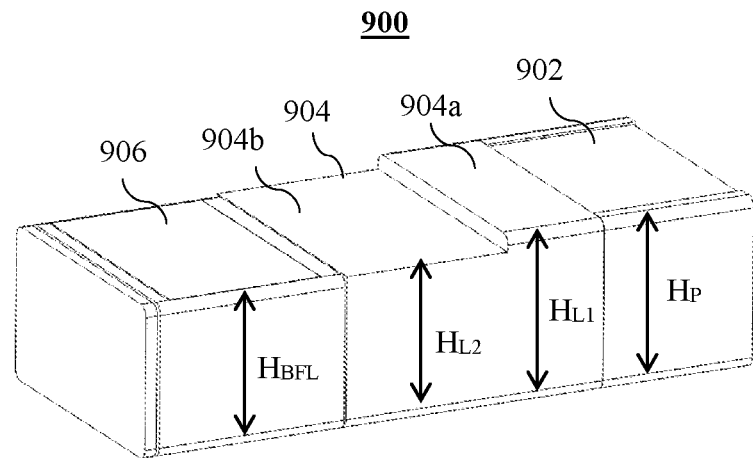
FIG. 9A shows a folded camera in a perspective view according to another exemplary embodiment disclosed herein.
Figure 9B:
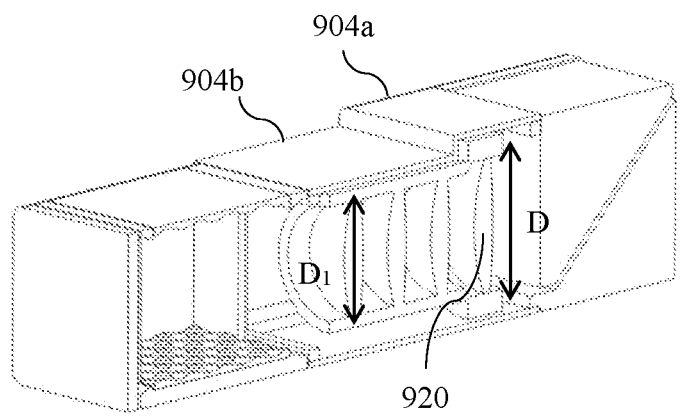
FIG. 9B shows the folded camera of FIG. 9A in a longitudinal cross section view.
Figure 9C:
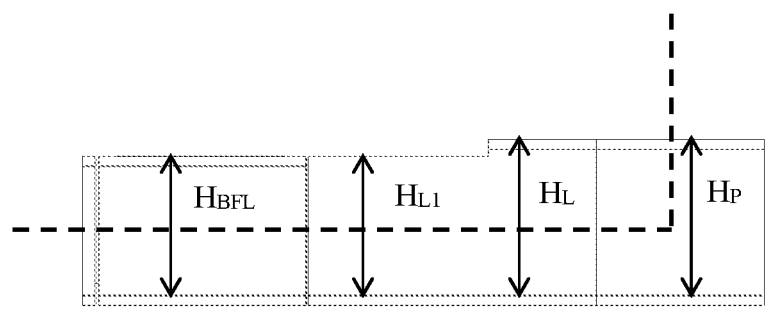
FIG. 9C shows the folded camera of FIG. 9A in a side view.

FIGS. 9A-9C show, in various views, a folded camera structure numbered 900 according to another exemplary embodiment disclosed herein. Like camera 500, camera 900 includes an OPFE section 902, a lens section 904 and a back focal length (BFL) section 906. The dimensions of the folded camera and the different sections may be in the same range as in cameras 100 and 500. Camera 900 may include other components with respective functionalities similar to or identical with the components of camera 500. Therefore, these components and their respective functionalities are not described in detail. Further, camera 900 may include two BFL sections or a split BFL section. Unlike in camera 500, lens section 904 in camera 900 has two different sub-sections 904a and 904b with two different heights marked $H_L$ and $H_{L1}$. Height $H_L$ of lens sub-section 904a is larger than height $H_{L1}$ of sub-section 904b, to accommodate at least one lens element 920 with a larger diameter D than the diameters of following (in the direction of the image sensor) lens elements (which, for example, have a smaller diameter $D_1$) For example, $H_{L1}$ may be smaller than $H_L$ by 0-3 mm.

While the exemplary embodiment in FIGS. 9A-9C shows a lens section with two different heights associated with two different subsections, a lens section may have more than two subsections with different heights. For example, if a lens includes N lens elements (typically N being between 1 and 6), then the lens section may include between 1 and N sub-sections. The N subsections may have the same height or different heights $H_{LN}$. In some embodiments with different lens subsection heights $H_{LN}$, the height may decrease in a step-wise manner from a subsection close to the OPFE (prism) section to a subsection close to the BFL section.

Figure 10A:
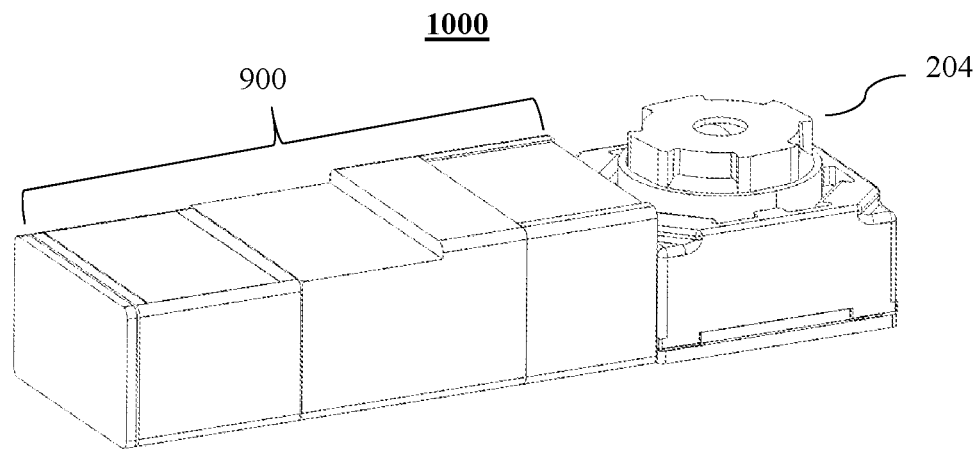
FIG. 10A shows a dual folded-upright camera in a perspective view according to another exemplary embodiment disclosed herein.
Figure 10B:
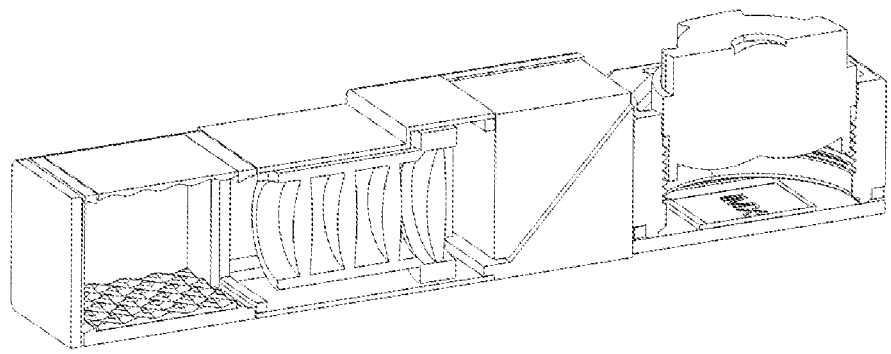
FIG. 10B shows the dual folded-upright camera of FIG. 10A in a longitudinal cross section view.
Figure 10C:
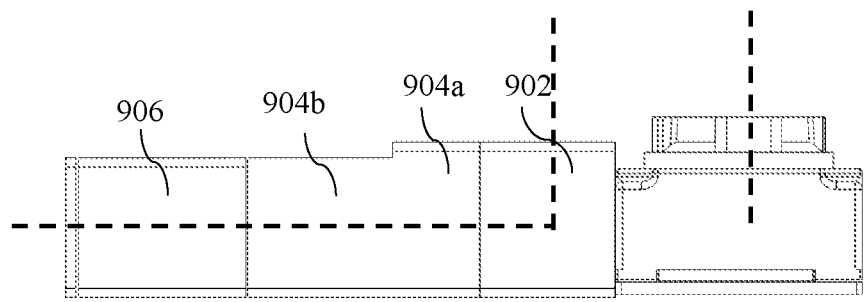
FIG. 10C shows the dual folded-upright camera of FIG. 10A in a side view.

Camera 900 can be included together with an upright camera 204 in a dual-camera 1000 as shown in FIGS. 10A-10C. In some examples, the length $L_{DC}$ and width $W_{DC}$ of dual-camera 1000 remains similar to those of dual-camera 600. However, dual-camera 1000 has a lower height not only in the BFL section 906 of the folded camera, but also in sub-section 904b of the lens section. Therefore, when dual-camera 1000 is incorporated in a mobile device such as a smartphone, the lower height of the BFL section $H_{BFL}$ and of sub-section 904b $H_{L2}$ enables an even shorter bump length $L_{B3}$.

Figure 11A:
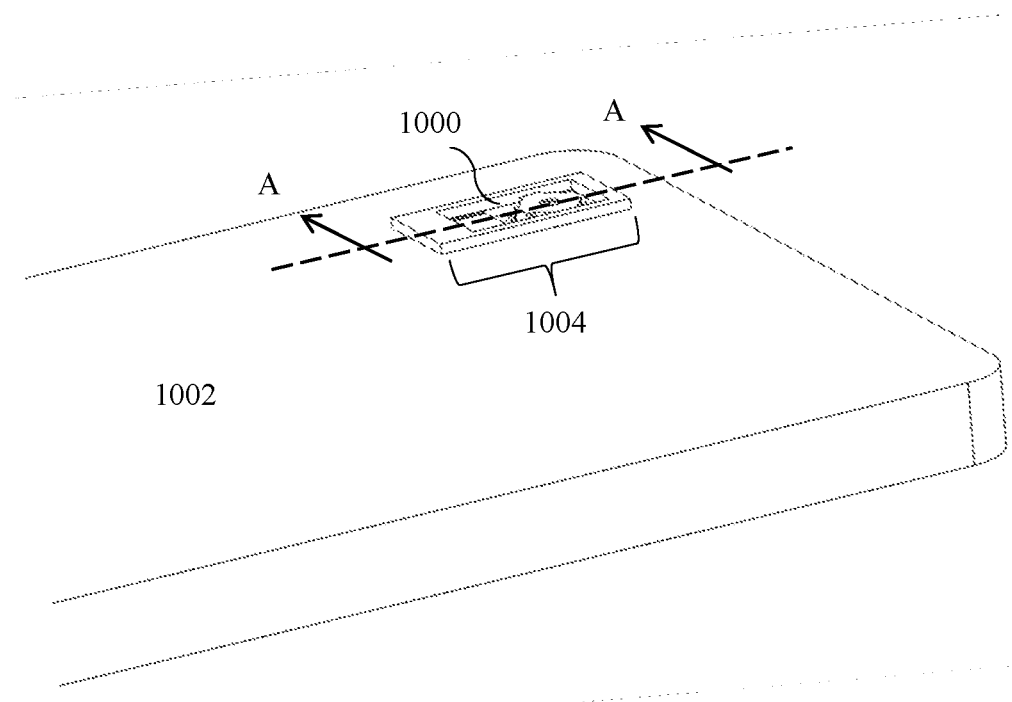
FIG. 11A shows the dual folded-upright camera of FIGS. 10A-10C included in a smartphone in a perspective view, according to an exemplary embodiment disclosed herein.
Figure 11B:
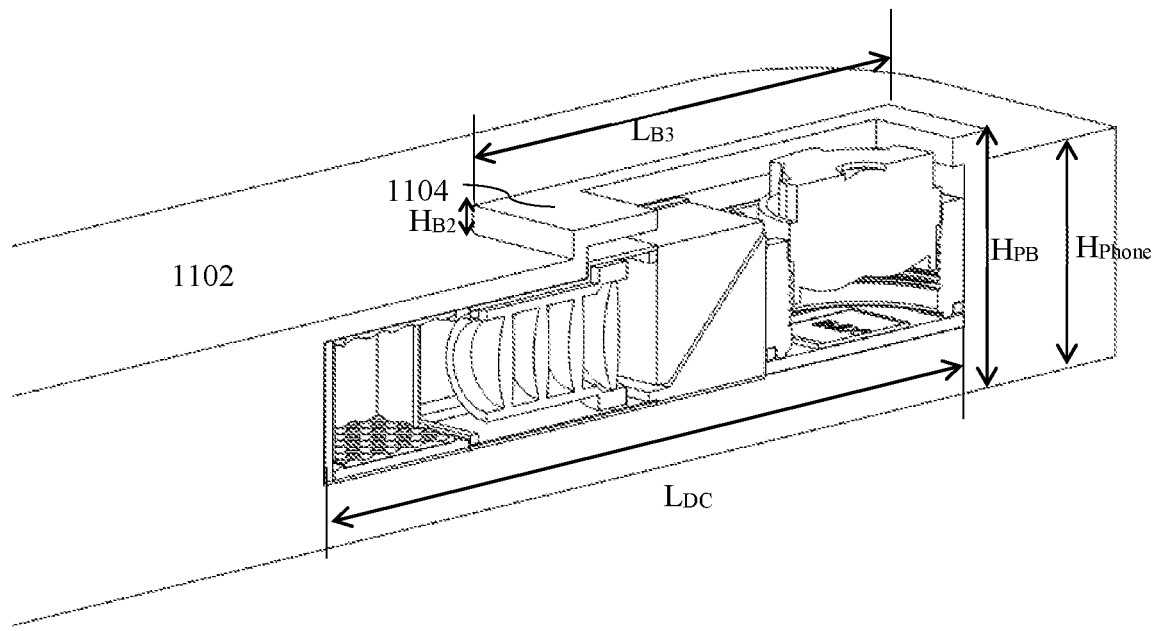
FIG. 11B shows a cross section with enlarged details of the dual folded-upright camera and the smartphone of FIG. 11A.

FIG. 11A shows the dual folded-upright camera of FIGS. 10A-10C included in a smartphone 1002 in a perspective view. FIG. 11B shows a cross section with enlarged details of the dual folded-upright camera and the smartphone. Smartphone 1100 has a bump 1104 protruding over a surface 1102. Bump 1104 has a length $L_{B3}$ and a height $H_{B2}$. To clarify, in smartphone 1100, $L_{B3}$ is smaller than $L_{B2}$ in FIG. 7 by about the length of lens sub-section 904b and is smaller than $L_{FL}$ by about the length of BFL section 906 plus the length of lens sub-section 904b. The marking of the bump height with "$H_{B2}$" here and in FIG. 7B does not necessarily mean that bumps 604 and 1104 have the same height. In this example, the dual-camera components that protrude and are visible include only the top of the lens of the upright camera and top parts of the OPFE and lens sub-section 904a of the folded camera. In general, a bump may be needed only in areas of the camera where a height of the upright camera and a height of a section of the folded camera is larger than $H_{phone}$.

Figure 12A:
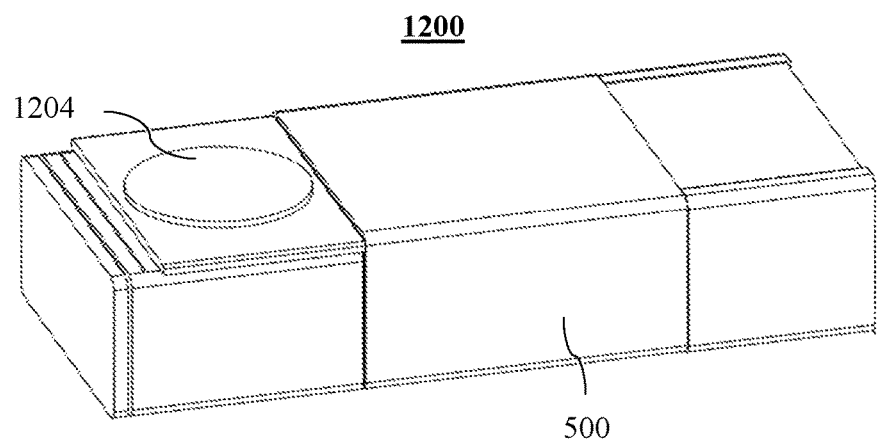
FIG. 12A shows a folded camera with a flash element in a perspective view according to an exemplary embodiment disclosed herein.
Figure 12B:
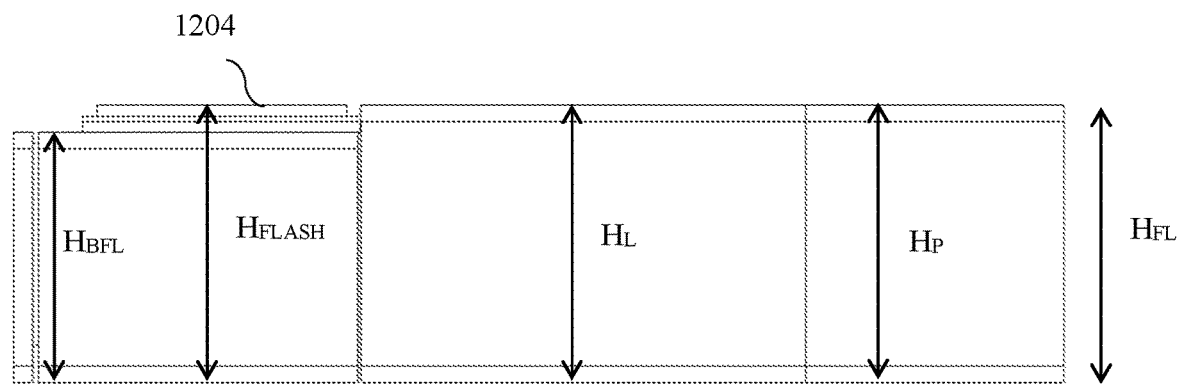
FIG. 12B shows the folded camera of FIG. 12A in a longitudinal cross section view.

Camera 500 can be provided with a flash (e.g. LED) element to obtain a folded camera with flash (or "flash folded camera"). FIG. 12A shows a perspective view, and FIG. 12B shows a side view of a flash folded camera 1200. A flash element 1204 may provide an external illumination source as needed by the photographed scene, as known in the art. The reduction of height in camera 500 BFL ($H_{BFL}$) may be used to house flash element 1204, i.e. flash element 1204 may be placed on top of top surface 510. The combined height from the bottom of camera 500 to the top of flash element 1204 is marked by $H_{FLASH}$, as seen in FIG. 12B. In some cases, $H_{FLASH}$ may be smaller than, or equal to camera 500 height ($H_{FL}$), as seen in FIG. 12B.

Figure 13A:
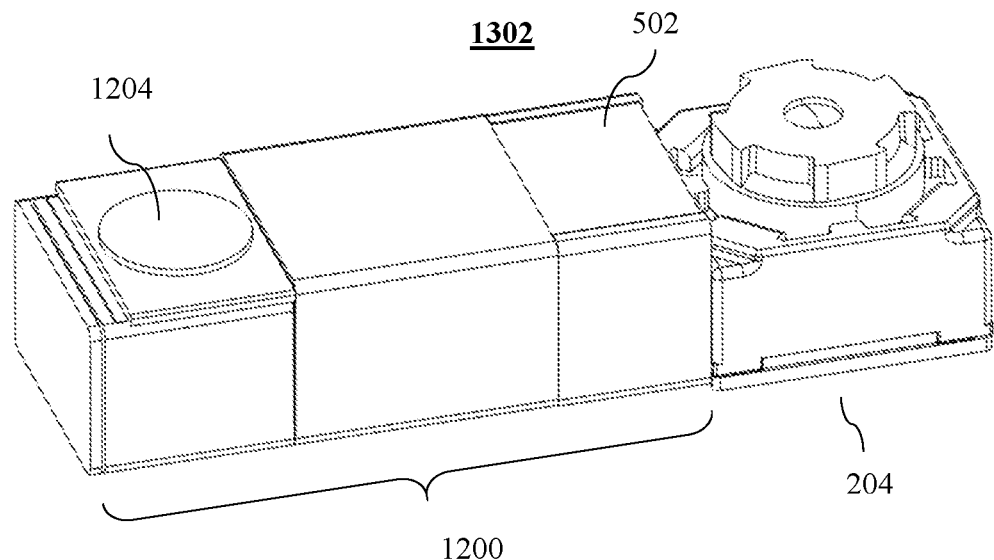
FIG. 13A shows a dual folded-upright camera with a folded camera as in FIG. 12 in a perspective view according to an exemplary embodiment disclosed herein.
Figure 13B:
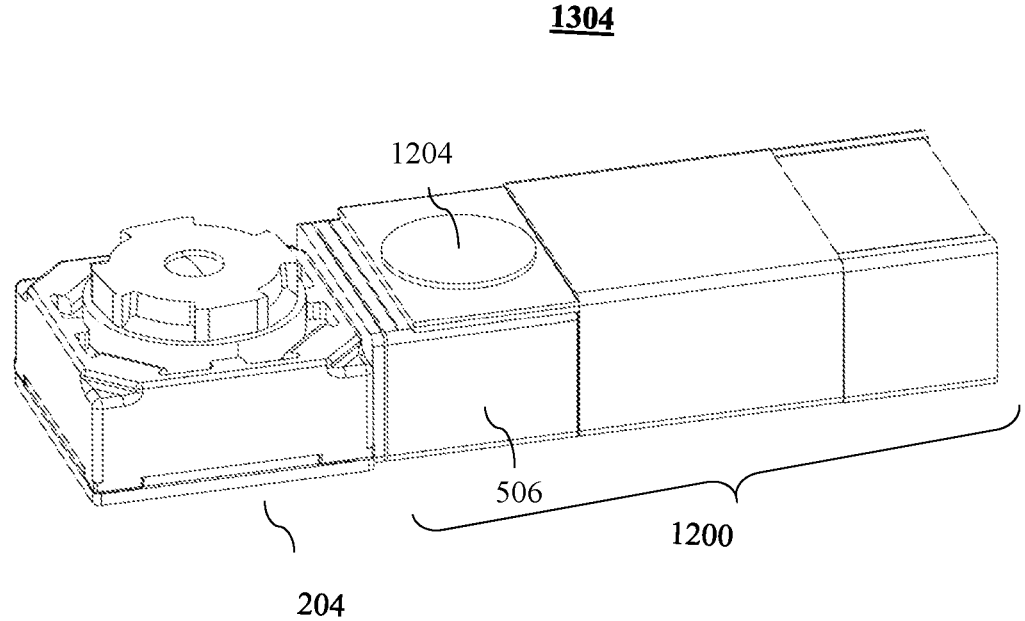
FIG. 13B shows a dual folded-upright camera with a folded camera as in FIG. 12 in a perspective view according to another exemplary embodiment disclosed herein.

Folded camera 1200 may be included with an upright camera 204 to form a dual camera. FIGS. 13A-13B show two embodiments of such a dual-camera. In FIG. 13A, a dual-camera 1302 includes an upright camera 204 positioned next to flash folded camera 1200 on the optical axis (+Z direction) toward the side of OPFE section 502. In FIG. 13B, a dual-camera 1304 includes an upright camera 204 positioned along camera 1200 on the optical axis closer to BFL section 506 side. In dual camera 1304, flash element 1204 is positioned between the optical aperture of camera 204 and the optical aperture of camera 500.

Figure 14A:
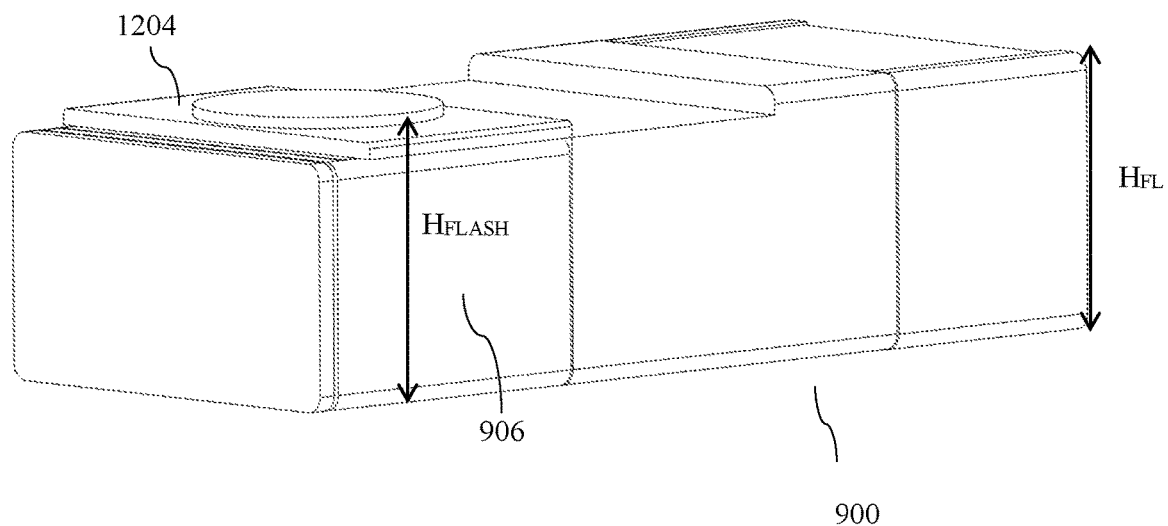
FIG. 14A shows a folded camera as in FIG. 9 with a flash element in a perspective view according to an exemplary embodiment disclosed herein.
Figure 14B:
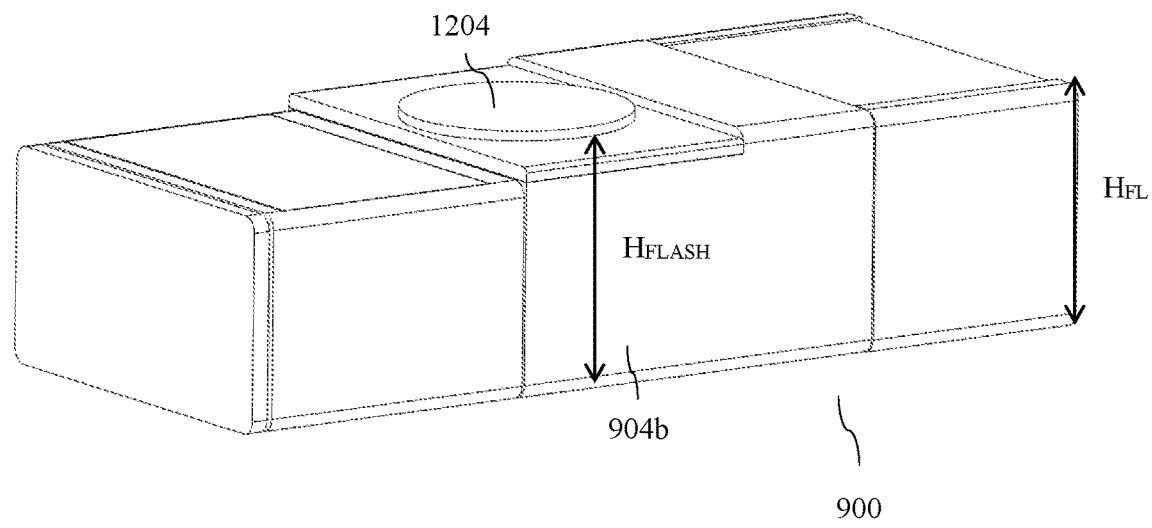
FIG. 14B shows a folded camera as in FIG. 9 with a flash element in a perspective view according to another exemplary embodiment disclosed herein.
Figure 14C:
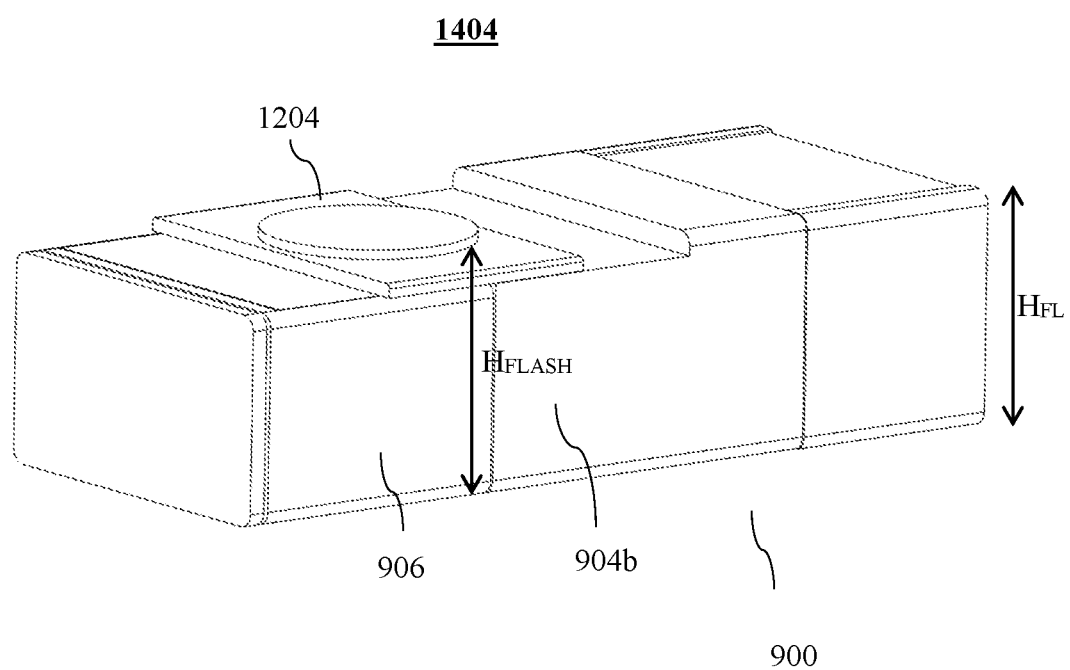
FIG. 14C shows a folded camera as in FIG. 9 with a flash element in a perspective view according to yet another exemplary embodiment disclosed herein.

In other dual-camera embodiments, shown in FIGS. 14A-14C, a camera such as camera 900 may also be provided with a flash element such as flash element 1204, which may be positioned on top of BFL section 906 (FIG. 14A), on top of lens sub-section 904 (FIG. 14B), or on top of both of these sections (FIG. 14C) (partially on top of each section in some embodiments). In all these cases, $H_{FLASH}$ will mark the combined height of from bottom of camera 900 to top of flash element 1204. $H_{FLASH}$ may be smaller than or equal to camera height $H_{FL}$. That is, the addition of a flash element does not lead to any protrusion above the largest height of the folded camera. Cameras 1400, 1402 or 1404 may be combined with an upright camera to form a dual camera (not shown).

Figure 15A:
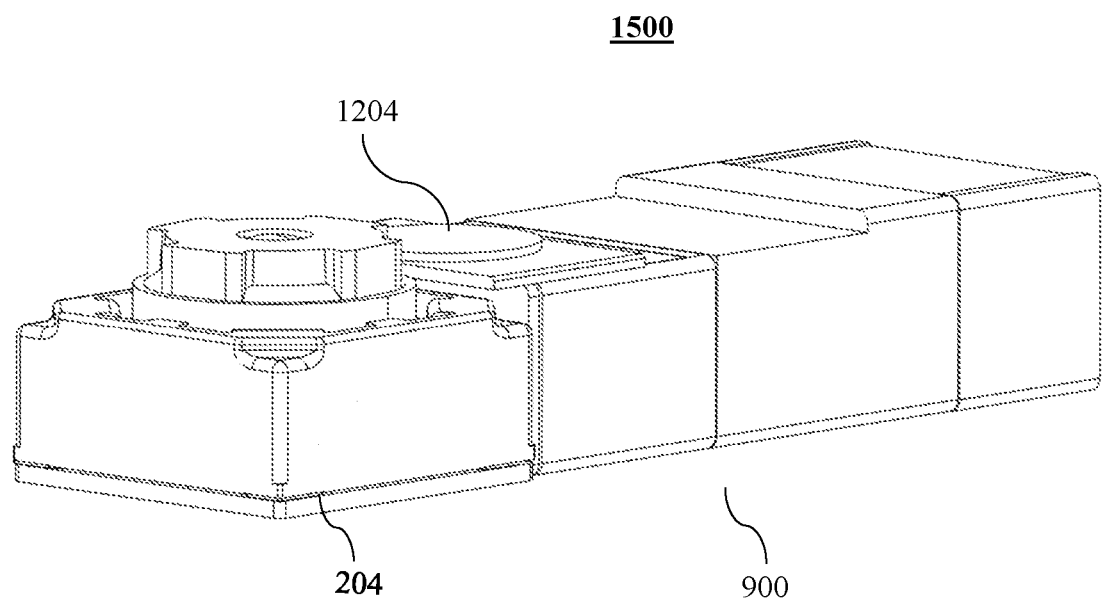
FIG. 15A shows a dual folded-upright camera with a folded camera as in FIG. 14 in a perspective view according to an exemplary embodiment disclosed herein.
Figure 15B:
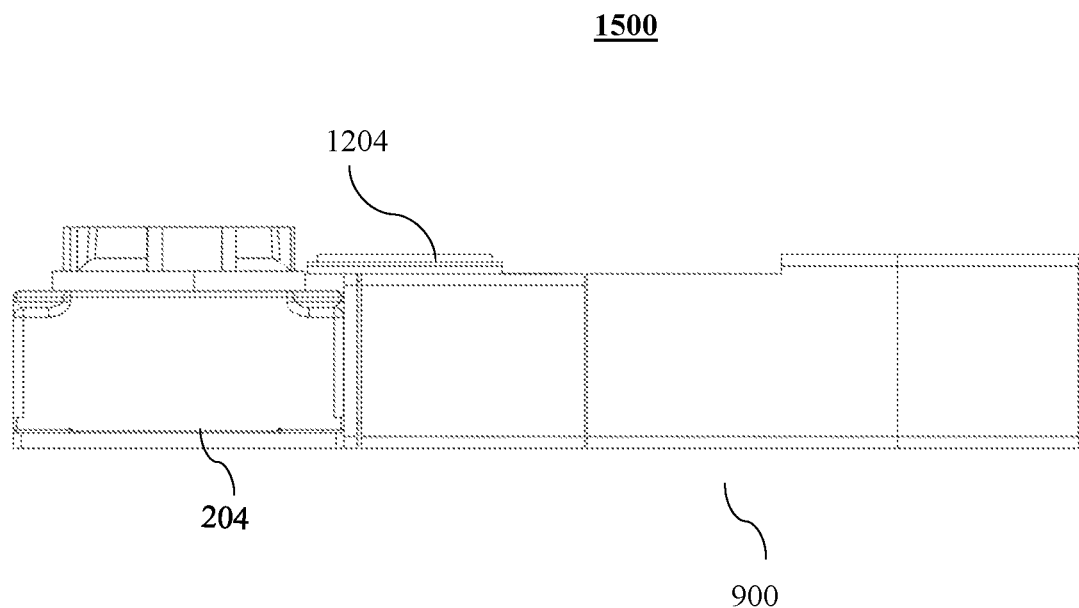
FIG. 15B shows the dual folded-upright camera of FIG. 15A in a side view.

In yet another dual-camera embodiment numbered 1500 and shown in FIGS. 15A and 15B, camera 900 may be combined with an upright camera 204 and flash element 1204, such that the flash element is positioned partially above camera 900 and partially above camera 204.

While this disclosure has been described in terms of certain embodiments and generally associated methods, alterations and permutations of the embodiments and methods will be apparent to those skilled in the art. The disclosure is to be understood as not limited by the specific embodiments described herein, but only by the scope of the appended claims.

What is claimed is:

1. A folded camera, comprising:
   an optical path folding element (OPFE) section including an OPFE for folding an optical path from a first direction to a second direction, the OPFE section having an OPFE height $H_P$ in the first direction; and
   a lens section positioned between the OPFE and an image sensor, the lens section having at least one lens section height $H_L$ in the first direction, wherein $H_L<H_P$.

2. The folded camera of claim 1, further comprising a back focal length (BFL) section extending between the lens section and the image sensor and having a BFL section height HBFL in the first direction, and wherein $H_{BFL}<H_L$.

3. The folded camera of claim 2, wherein the lens section includes two subsections, wherein a lens subsection closer to the BFL section has a height $H_{L2}$, and wherein $H_{L2}<H_L$.

4. The folded camera of claim 3, wherein $H_{L2}=H_{BFL}$.

5. The folded camera of claim 2, further comprising a flash element positioned on the BFL section and having a height $H_{FLASH}<H_P$.

6. A dual-aperture camera comprising a folded camera according to claim 1 together with an upright camera.

7. The dual-aperture camera of claim 6, wherein the upright camera has an upright camera optical axis parallel to the first direction.

8. A mobile electronic device comprising a dual-aperture camera according to claim 6.

9. The mobile electronic device of claim 8, comprising a bump on a surface thereof, wherein the bump surrounds an area including the folded camera and wherein at least one bump dimension is defined by a folded camera dimension.

10. The mobile electronic device of claim 9, wherein the bump has a length, $L_B$, defined along the second direction, wherein the dual-aperture camera has a length, $L_{DC}$, defined along the second direction, and wherein $L_B<L_{DC}$.

11. The mobile electronic device of claim 9, wherein the mobile electronic device is a smartphone.

12. A mobile electronic device comprising a folded camera according to claim 1.

13. The mobile electronic device of claim 12, comprising a bump on a surface thereof, wherein the bump surrounds an area including the folded camera and wherein at least one bump dimension is defined by a folded camera dimension.

14. The mobile electronic device of claim 13, wherein the bump has a length, $L_B$, defined along the second direction, wherein the dual-aperture camera has a length, $L_{DC}$, defined along the second direction, and wherein $L_B<L_{DC}$.

15. The mobile electronic device of claim 13, wherein the mobile electronic device is a smartphone.

* * * * *